US011360232B2

(12) United States Patent
Wang et al.

(10) Patent No.: US 11,360,232 B2
(45) Date of Patent: Jun. 14, 2022

(54) MAPPING WAVE SLOWNESS USING MULTI-MODE SEMBLANCE PROCESSING TECHNIQUES

(71) Applicant: HALLIBURTON ENERGY SERVICES, INC., Houston, TX (US)

(72) Inventors: Ruijia Wang, Singapore (SG); Wei-Bin Ewe, Singapore (SG); Jiajun Zhao, Houston, TX (US)

(73) Assignee: HALLIBURTON ENERGY SERVICES, INC., Houston, TX (US)

(*) Notice: Subject to any disclaimer, the term of this patent is extended or adjusted under 35 U.S.C. 154(b) by 381 days.

(21) Appl. No.: 16/398,075

(22) Filed: Apr. 29, 2019

(65) Prior Publication Data

US 2020/0341163 A1    Oct. 29, 2020

Related U.S. Application Data

(63) Continuation of application No. PCT/US2019/029700, filed on Apr. 29, 2019.

(51) Int. Cl.
*G01V 1/50* (2006.01)

(52) U.S. Cl.
CPC ............ *G01V 1/50* (2013.01); *G01V 2210/21* (2013.01); *G01V 2210/43* (2013.01); *G01V 2210/6222* (2013.01)

(58) Field of Classification Search
CPC .. G01V 1/50; G01V 2210/21; G01V 2210/43; G01V 2210/6222
See application file for complete search history.

(56) References Cited

U.S. PATENT DOCUMENTS

| 4,594,691 A | 6/1986 | Kimball et al. |
| 5,278,805 A | 1/1994 | Kimball |
| 5,661,696 A * | 8/1997 | Kimball ............... G01V 1/44 367/26 |

(Continued)

FOREIGN PATENT DOCUMENTS

| WO | 2014070182 A1 | 5/2014 |
| WO | 2017172799 A1 | 10/2017 |
| WO | 2018231234 A1 | 12/2018 |

OTHER PUBLICATIONS

NPL_075 Search Results, Jul. 14, 2021, 1 pp. (year: 2021).*

(Continued)

*Primary Examiner* — Toan M Le
*Assistant Examiner* — Xiuqin Sun
(74) *Attorney, Agent, or Firm* — Polsinelli PC

(57) ABSTRACT

Techniques for calculating and visually presenting multiple acoustic modes that have different formation slowness are disclosed herein. The techniques include methods for receiving time-domain waveforms from adjacent formations in a borehole, processing each of the time-domain waveforms to generate frequency-domain spectrums, selecting frequency and slowness values, and predicting travel time of a mode associated with the slowness value. In some aspects, the method further includes steps for calculating a semblance difference of the frequency-domain spectrums based on the frequency value, the slowness value and the predicted travel time. Systems and computer-readable media are also provided.

20 Claims, 17 Drawing Sheets

(56) References Cited

U.S. PATENT DOCUMENTS

| | | | | |
|---|---|---|---|---|
| 2006/0285439 | A1* | 12/2006 | Haugland | G01V 1/48 367/75 |
| 2008/0123468 | A1* | 5/2008 | Akhmetsafin | G01V 1/48 367/25 |
| 2012/0106292 | A1* | 5/2012 | Fuller | G01V 1/42 367/27 |
| 2012/0147702 | A1* | 6/2012 | Valero | G01V 1/48 367/31 |
| 2018/0196156 | A1 | 7/2018 | Assous et al. | |
| 2018/0267190 | A1 | 9/2018 | Li et al. | |
| 2019/0055830 | A1 | 2/2019 | Skataric et al. | |
| 2019/0086571 | A1 | 3/2019 | Walker | |

OTHER PUBLICATIONS

Ekstrom, M. P., 1996, "Dispersion Estimation from Borehole Acoustic Arrays Using a Modified Matrix Pencil Algorithm", 1996 IEEE Proceedings of ASILOMAR-29, pp. 449-453.

International Search Report for PCT application No. PCT/US2019/029700 dated Jan. 22, 2020, 7 pages.

* cited by examiner

US 11,360,232 B2

MAPPING WAVE SLOWNESS USING MULTI-MODE SEMBLANCE PROCESSING TECHNIQUES

TECHNICAL FIELD

The present disclosure pertains to acoustic or sonic logging in a wellbore environment, and more specifically, to processing and visually presenting signal response information using multi-modal frequency semblance processing techniques.

BACKGROUND

Acoustic or sonic logging tools are often employed in wellbore environments for a variety of purposes, including formation measurements and material characterizations. In general, acoustic logging tools are disposed in a borehole and operate to generate/receive signals and measure signal responses (or signal dispersions) for different target modes. The signal responses or signal dispersions for a given target mode are further analyzed to determine various geophysical and mechanical properties of the borehole and adjacent formations. Signal dispersions are often characterized by a relationship between signal wave slowness (μs/ft) and signal wave frequency, which provides insight into material-types and geometric properties of the borehole and adjacent formations. Put differently, a number of borehole modal waves are dispersive modes, whose propagating speed varies with frequency. The dispersion of borehole waves carries essential information about the formations and borehole fluid; therefore, extracting the dispersion properties of modal waves is a primary task of sonic data processing.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1A:
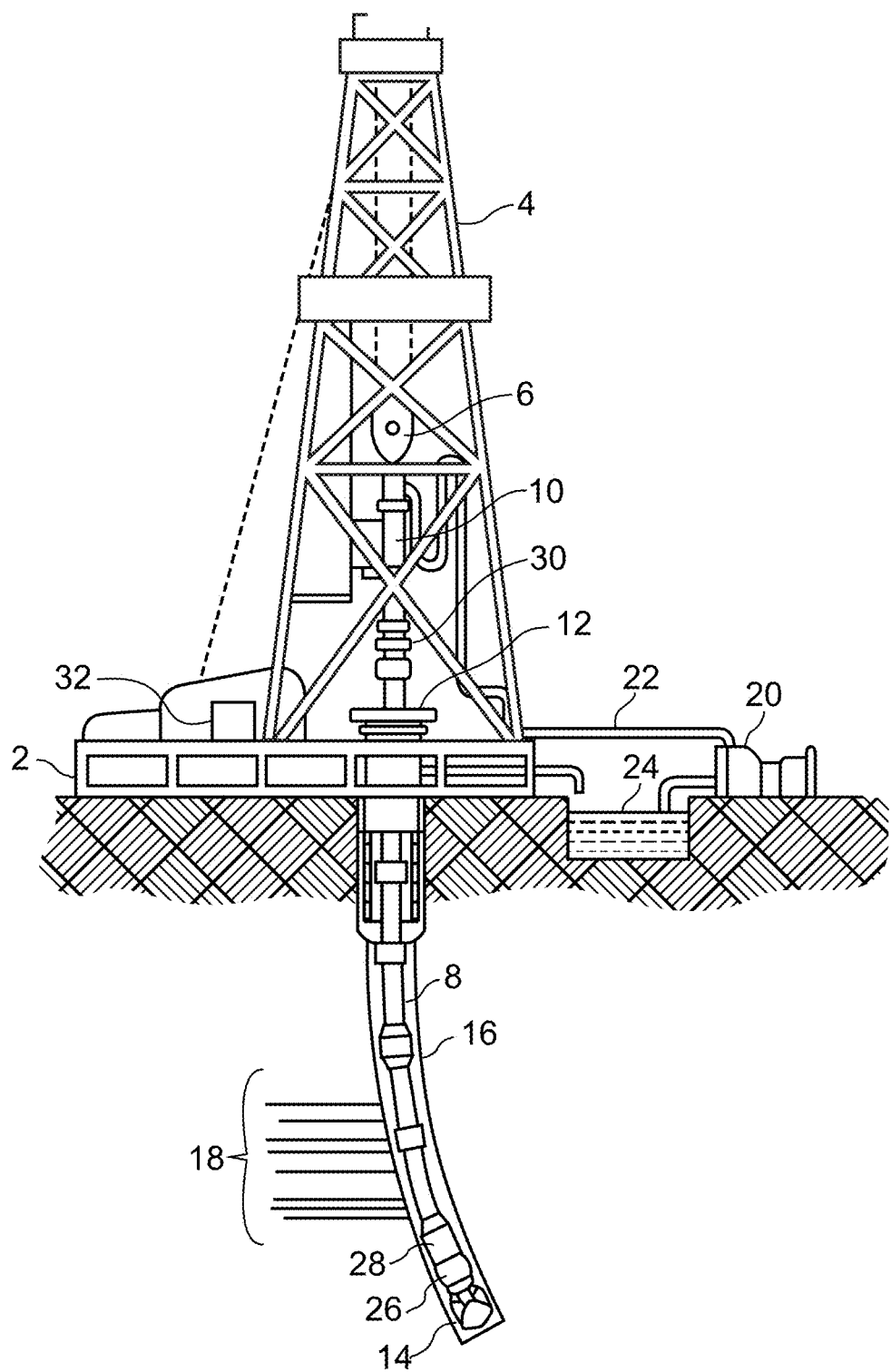
FIG. 1A is a schematic diagram of an example logging-while-drilling (LWD) environment.

As discussed in greater detail herein, the present disclosure provides techniques to extract, analyze, and validate signal or dispersion responses for acoustic or sonic wellbore tools. In particular, the techniques disclosed herein use frequency semblance and coherence calculations to generate improved quality control (QC) log displays that facilitate the validation of signal or dispersion response results (e.g., real-time frequency domain information). Importantly, the techniques disclosed herein are not limited to dipole shear logging, but may also be applied to other types of wave propagating modes such as quadrupole waves in any formation or leaky-P waves in soft formations, and the like.

In sonic logging, dipole and quadrupole wave fields produced by a wireline logging or logging while drilling (LWD) tool often excite more than one borehole wave mode, e.g., a dipole source excites both flexural waves and leaky-P waves in soft formations.

Conventional dispersion processing methods can be separated into two primary groups: (1) single-mode processing methods, and (2) multi-mode methods. Single mode processing methods variously include differential phase frequency semblance (DPFS), the weighted spectral semblance method (WSSM), and the MUSIC method. Conventional multimode processing consists of the Matrix-pencil method and the Prony method.

Although single-mode processing methods (e.g., conventional DPFS) are stable, they only provide a single slowness value at each frequency. Therefore, if more than one mode exists, conventional DPFS processing tends to provide the slowness of the dominant mode, while ignoring smaller wave amplitudes associated with other waves, in which case, borehole data are not fully utilized.

Conversely, while multimode processing methods can offer more than one modal slowness at each frequency, they can be unstable under some cases. Multimode processing methods commonly use the summation of exponential signal models to approach the measured data. For example, the Prony and Matrix-pencil methods are based on a list of assumed signal models, and solving the coefficient of these signals yields modal slowness and attenuation. However, these methods implicitly separate signals for each frequency, and thus are sensitive to unbalance receiver arrays, data quality, and formation heterogeneity. Additionally, the processing might be easily affected by noises as the practitioner performs processing at each independent frequency. Usually, in order to mitigate noise issues, the resulting frequency semblance map is smoothed to produce stable slowness estimates. Although such methods can be suited for homogeneous formations (e.g., where borehole wave modes decay exponentially along the borehole axis), they are lacking for field data applications, especially for heterogenous formations when multimode processing can become unstable and/or present fictitious modes. As such, conventional multimodal processing methods are not well suited for processing signals collected from non-homogeneous formations, and signals that cannot be approximated by exponential models.

Aspects of the disclosed technology address the foregoing limitations of conventional single-mode and multi-mode wave dispersion processing techniques. In particular, the present disclosure provides innovative signal processing techniques that improve upon convention semblance processing by utilizing adjacent multi-frequency data to enhance signals based on expected travel times, for example, the differential phase frequency semblance (DPFS) method. Travel time information can be calculated from assumed slowness and receiver offsets. By incorporating travel time information into the processing, the proposed method can generate multi-mode slowness estimates at a single frequency. As discussed in further detail below, such techniques can be implemented as frequency-domain (e.g., modified differential phase frequency semblance DPFS), or time-domain (e.g., multi-frequency-band DPTS) processing methods. Although examples of DPFS and DPTS methods are discussed herein to illustrate some aspects of the disclosed technology, it is understood that the proposed approach can be combined with other semblance processing methods, for example, the weighted spectral semblance method (WSSM), the MUSIC method and the slowness-time coherence (STC) method, which are also contemplated by this invention.

Figure 1B:
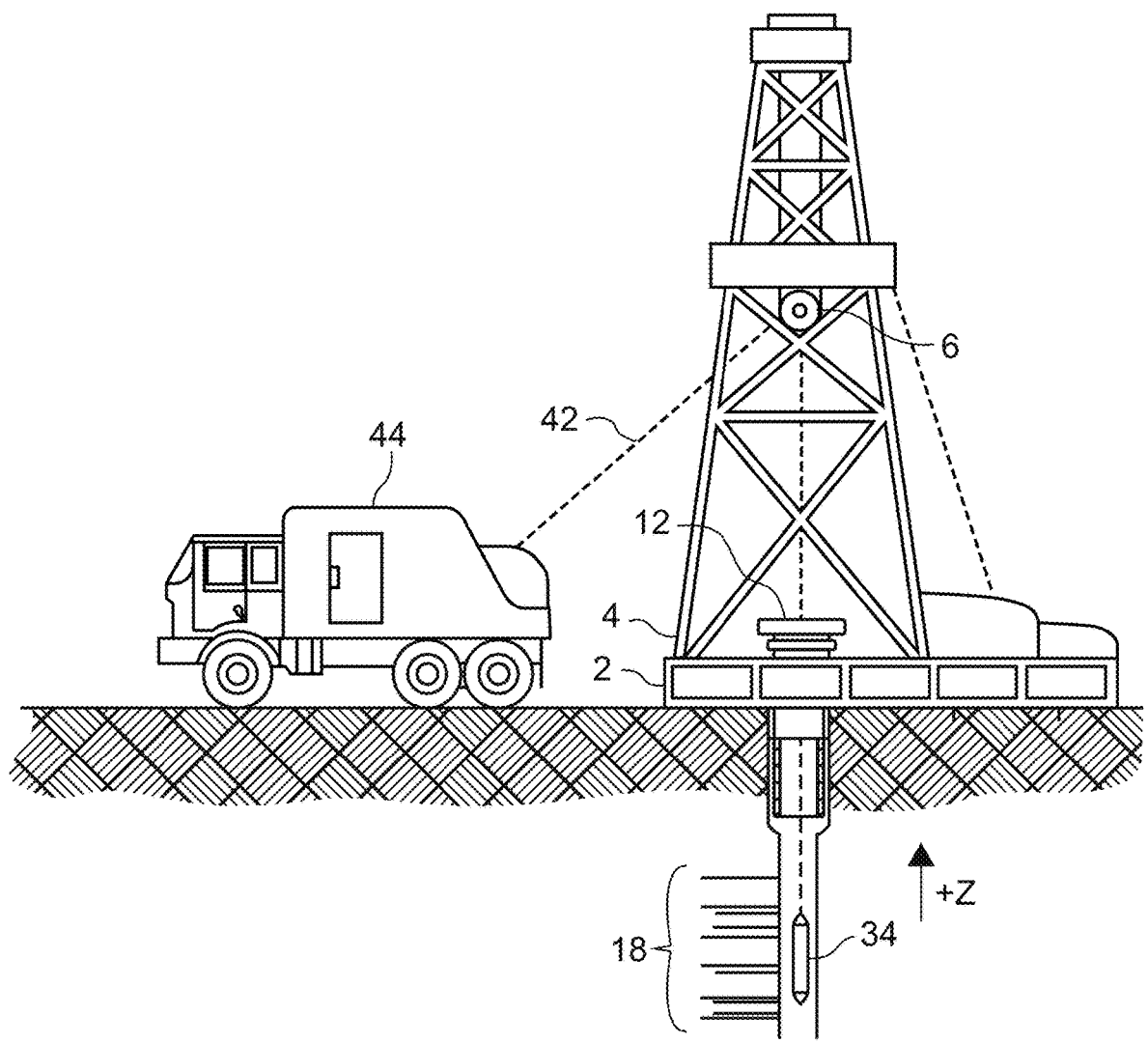
FIG. 1B is a schematic diagram of an example wireline logging environment.
Figure 2:
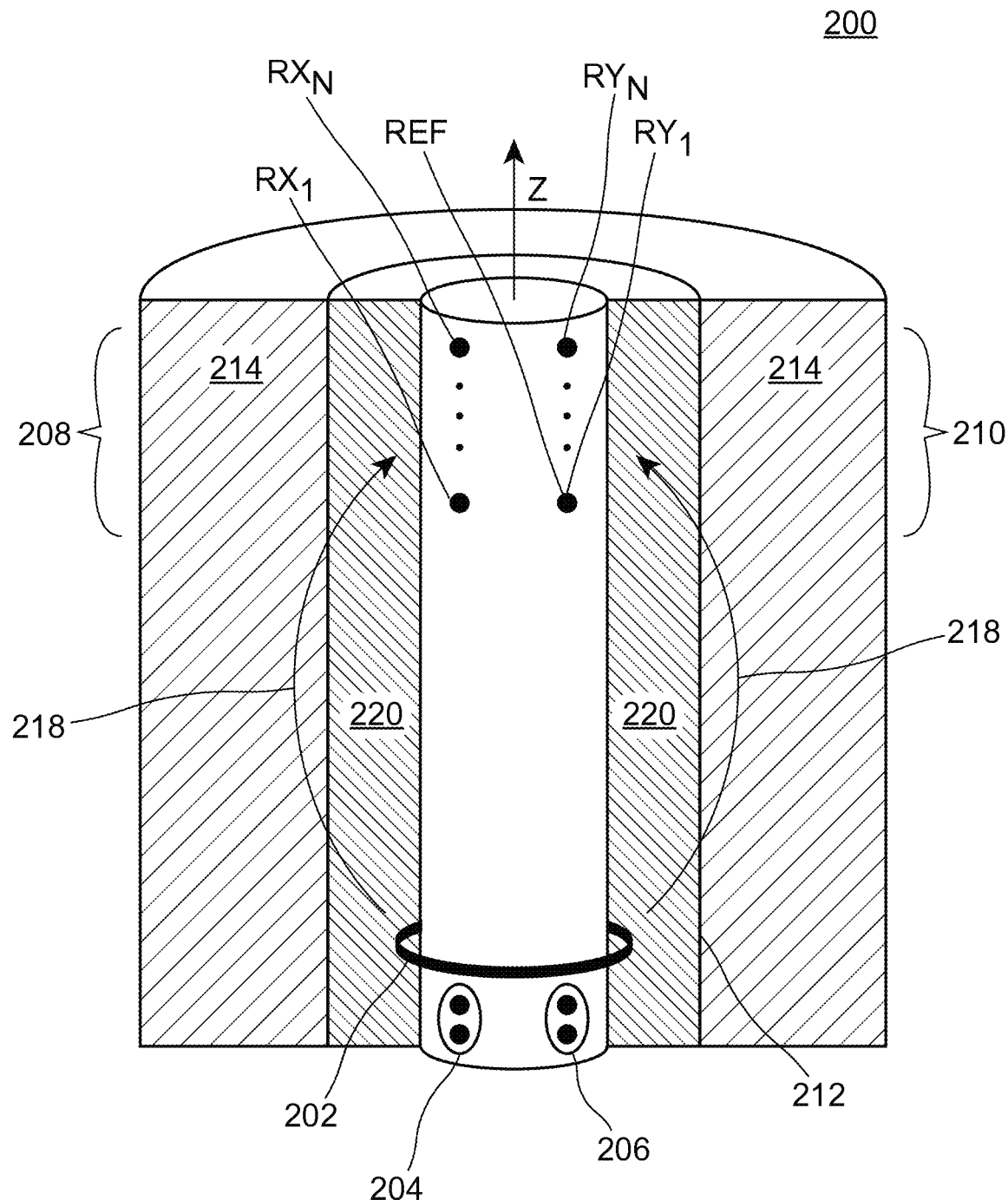
FIG. 2 is a front, cut-away view of a sonic imaging apparatus, in the form of a down hole tool, according to various embodiments of the invention.

The disclosure now turns to FIGS. 1A-B, and FIG. 2 to provide a brief introductory description of the larger systems that can be employed to practice the concepts, methods, and techniques disclosed herein. A more detailed description of the methods and systems for implementing the improved semblance processing techniques of the disclosed technology will then follow.

FIG. 1A shows an illustrative logging while drilling (LWD) environment. A drilling platform 2 supports derrick 4 having traveling block 6 for raising and lowering drill string 8. Kelly 10 supports drill string 8 as it is lowered through rotary table 12. Drill bit 14 is driven by a downhole motor and/or rotation of drill string 8. As bit 14 rotates, it creates a borehole 16 that passes through various formations 18. Pump 20 circulates drilling fluid through a feed pipe 22 to kelly 10, downhole through the interior of drill string 8, through orifices in drill bit 14, back to the surface via the annulus around drill string 8, and into retention pit 24. The drilling fluid transports cuttings from the borehole into pit 24 and aids in maintaining borehole integrity.

Downhole tool 26 can take the form of a drill collar (i.e., a thick-walled tubular that provides weight and rigidity to aid the drilling process) or other arrangements known in the art. Further, downhole tool 26 can include acoustic (e.g., sonic, ultrasonic, etc.) logging tools and/or corresponding components, integrated into the bottom-hole assembly near bit 14. In this fashion, as bit 14 extends the borehole through formations, the bottom-hole assembly (e.g., the acoustic logging tool) can collect acoustic logging data. For example, acoustic logging tools can include transmitters (e.g., monopole, dipole, quadrupole, etc.) to generate and transmit acoustic signals/waves into the borehole environment. These acoustic signals subsequently propagate in and along the borehole and surrounding formation and create acoustic signal responses or waveforms, which are received/recorded by evenly spaced receivers. These receivers may be arranged in an array and may be evenly spaced apart to facilitate capturing and processing acoustic response signals at specific intervals. The acoustic response signals are further analyzed to determine borehole and adjacent formation properties and/or characteristics.

For purposes of communication, a downhole telemetry sub 28 can be included in the bottom-hole assembly to transfer measurement data to surface receiver 30 and to receive commands from the surface. Mud pulse telemetry is one common telemetry technique for transferring tool measurements to surface receivers and receiving commands from the surface, but other telemetry techniques can also be used. In some embodiments, telemetry sub 28 can store logging data for later retrieval at the surface when the logging assembly is recovered.

At the surface, surface receiver 30 can receive the uplink signal from the downhole telemetry sub 28 and can communicate the signal to data acquisition module 32. Module 32 can include one or more processors, storage mediums, input devices, output devices, software, and the like as described in detail in FIGS. 2A and 2B. Module 32 can collect, store, and/or process the data received from tool 26 as described herein.

At various times during the drilling process, drill string 8 may be removed from the borehole as shown in FIG. 1B. Once drill string 8 has been removed, logging operations can be conducted using a downhole tool 34 (i.e., a sensing instrument sonde) suspended by a conveyance 42. In one or more embodiments, the conveyance 42 can be a cable having conductors for transporting power to the tool and telemetry from the tool to the surface.

Downhole tool 34 may have pads and/or centralizing springs to maintain the tool near the central axis of the borehole or to bias the tool towards the borehole wall as the tool is moved downhole or uphole.

Downhole tool 34 can include an acoustic or sonic logging instrument that collects acoustic logging data within the borehole 16. A logging facility 44 includes a computer system, such as those described with reference to FIGS. 2A and 2B, for collecting, storing, and/or processing the measurements gathered by logging tool 34. In one or more embodiments, the conveyance 42 of the downhole tool 34 may be at least one of wires, conductive or non-conductive cable (e.g., slickline, etc.), as well as tubular conveyances, such as coiled tubing, pipe string, or downhole tractor. The downhole tool 34 may have a local power supply, such as batteries, downhole generator and the like. When employing non-conductive cable, coiled tubing, pipe string, or downhole tractor, communication can be supported using, for example, wireless protocols (e.g. EM, acoustic, etc.), and/or measurements and logging data may be stored in local memory for subsequent retrieval.

Although FIGS. 1A and 1B depict specific borehole configurations, it is understood that the present disclosure is equally well suited for use in wellbores having other orientations including vertical wellbores, horizontal wellbores, slanted wellbores, multilateral wellbores and the like. While FIGS. 1A and 1B depict an onshore operation, it should also be understood that the present disclosure is equally well suited for use in offshore operations. Moreover, the present disclosure is not limited to the environments depicted in FIGS. 1A and 1B, and can also be used, for example, in other well operations such as production tubing operations, jointed tubing operations, coiled tubing operations, combinations thereof, and the like.

FIG. 2 is a front, cut-away view of an apparatus 200, in the form of a downhole tool, according to various embodiments of the invention. One or more transmitting sources (e.g., a monopole transmitter 202, X and Y dipole transmitters 204, 206, respectively) are used to create energy (pressure) waves 218 that travel in the borehole fluid 220 in the formation 214, to be received at the receivers RXN, RYN (e.g., at the X receiver array 208 and the wide receiver array 210) located at different spatial locations within the borehole 212.

Here apparatus 200 is shown in the form of an acoustic tool with monopole and dipole transmitting sources 202; and 204, 206, respectively. Apparatus 200 is disposed in borehole 212, with its longitudinal axis substantially aligned with the z-axis. This apparatus can be used in conjunction with the signal processing techniques described herein.

In some embodiments, as illustrated in FIG. 2, acoustic tool apparatus 200 includes an acoustic source (transmitter), and a set of receivers RXN, RYN that are spatially separated by distances ranging from several inches to several feet. Apparatus 200 comprises two azimuthally orthogonal dipole transmitter sources, i.e., X-dipole transmitter source 204, and Y-dipole transmitter source 206. Sources 204, 206 can be used to excite the flexural mode. Apparatus 200 can also include ring transmitter source 202, for example, which is configured to excite a monopole mode, and/or a quadrupole source, which is configured to excite a screw wave.

Apparatus 200 also includes two azimuthally orthogonal receiver arrays 208, 210, aligned along the X and Y directions, respectively, to record pressure waveforms resulting from the energy waves 218 transmitted into the formation 214. Each receiver array 208, 210 has front and back receivers to form sum and difference channels. When the dipole transmitters 204, 206 are activated, the difference channels are used to record across dipole waveforms.

In some implementations recorded flexural waveforms can be noted by in-line components, (XX, YY), and cross-line components, (XY, YX). The first letter refers to the transmitter, and the second letter to the receiver. Thus, for example, the XX recorded waveform is formed by firing the X-directed dipole transmitter and receiving the difference channel of the X-directed receiver array. When ring source 202 is activated, the sum channel is used to record different propagation modes, such as compressional, shear, Stoneley and pseudo-Rayleigh modes, among others. When a quadrupole source is activated, screw waves are obtained by taking the difference between a sum of the front and back receivers and a sum of the left and right receivers. While apparatus 200, as shown in FIG. 2, is useful to describe the details of the processing mechanism described herein, the particular arrangement of transmitters and receivers is not meant to limit the scope of the disclosed embodiments. Other physical arrangements of sources 202, 204, 206 and receivers RXN, RYN, are possible without departing from the scope of the disclosed technology.

Figure 3A:
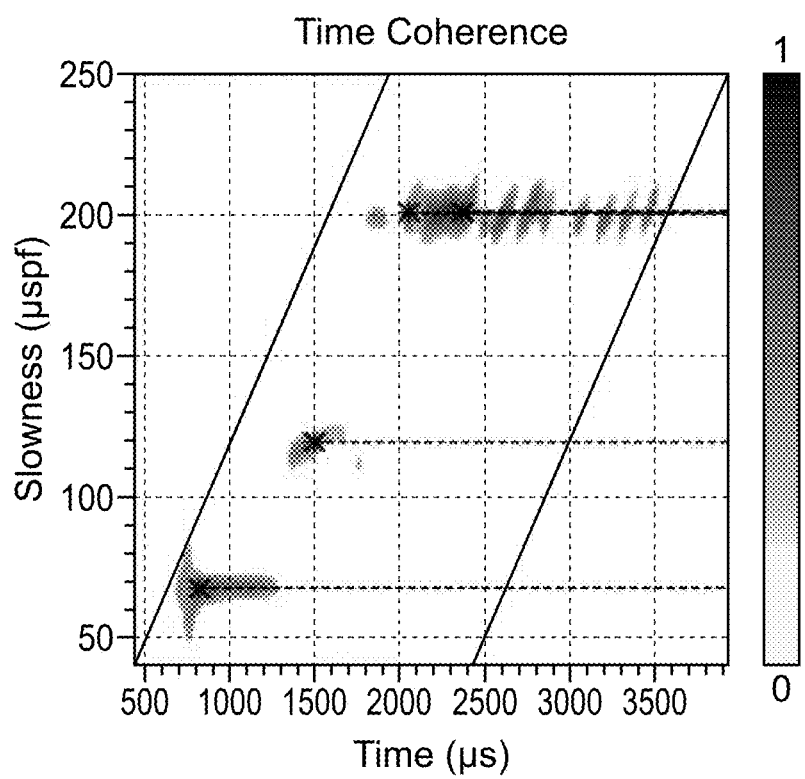
FIG. 3A is a semblance map, graphically representing time vs. slowness.
Figure 3B:
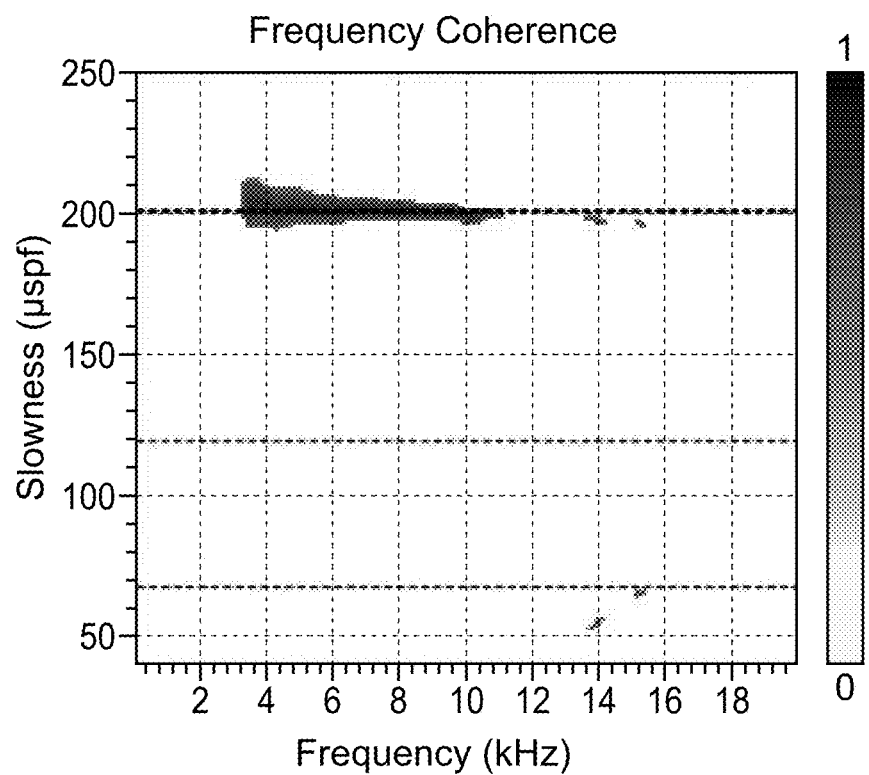
FIG. 3B is a semblance map, graphically representing frequency vs. slowness.

FIGS. 3A and 3B are semblance maps, graphically representing time vs. slowness, and frequency vs. slowness, respectively, for a single acquisition QC for monopole data processing performed using conventional DPFS techniques. The data presented in FIGS. 3A and 3B illustrate limitations of conventional DPFS processing. For example, the compressional, shear and Stoneley waves are all evident in the time series vs. slowness-time semblance map of FIG. 3A. However, only the Stoneley waves are presented in the frequency-semblance map of FIG. 3B. Notably, in the frequency-semblance map of FIG. 3B, the compressional and shear waves are missing due to their low amplitude and low coherence. Consequently, single mode dispersion processing techniques, such as those of conventional DPFS, cannot be reliably utilized to validate time-domain processing results, because they cannot present all possible modes.

In a conventional DPFS processing methods, semblance and phase differences of inputted waveforms are calculated by looping over the frequency axis and the slowness axis, but without the use of travel time information. For example, in conventional processing methods, waveforms are first inputted and converted to the frequency domain, then the semblance or phase difference is calculated by looping over the frequency axis and the slowness axis. For example, one might compute the phase difference $\phi$ using the relationship of equation (1):

$$\phi(f, s) = \frac{2 \sum_{j=1}^{j=N-1} \sum_{k=j+1}^{k=N} |\tan^{-1}(Y_j(f, s)) - \tan^{-1}(Y_k(f, s))|}{N(N-1)} \quad (1)$$

where f represents the frequency, s represents the slowness, N represents the number of receivers, and $Y_j(f, s)$, $Y_k(f, s)$ represent the waveform spectrum at the $j^{th}$ or $k^{th}$ receiver after propagating to the reference receiver with slowness s. The $Y_j$, for example, can be expressed according to the relationship of equation (2):

$$Y_j(f,s) = X_j(f) \exp(i2\pi fsz_r - i2\pi fsz_j) \qquad (2)$$

where $X_j(f)$ represents the spectrum of the waveform at the $j^{th}$ receiver. And wherein $z_r$ and $z_j$ describe the offset of the reference and $j^{th}$ receiver, respectively. The phase difference value obtained in equation (1) can be converted to semblance value using equation (3):

$$Semb(f,s) = \left| 1 - \frac{2\phi(f,s)}{\pi} \right| \qquad (3)$$

After completing the loops on the frequency and the slowness axis with equations 1-3, the slowness-frequency semblance map Semb(f, s) is obtained. Extracting peaks on the map yields modal dispersion at different frequencies.

Note that conventional DPFS processing utilizes a single frequency to calculate the phase difference or signal semblance of the receiver array. To suppress noise, the resulting semblance or phase-difference map is usually smoothed, for example, using the relationship of equation (4):

$$F(f_q, s) = \sum_{q=l-m}^{l+m} W(f_q, f_m) Semb(f_q, s) \qquad (4)$$

where $F(f_l, s)$ is the smoothed semblance map, $W(f_q, f_m)$ is a weighting function for smoothing. A Gaussian function, as an example, might be used to generate the weights, as provided by the example of equation (5)

$$W(f_q, f_m) = \exp\left(-\frac{(f_m - f_q)^2}{2\sigma^2}\right) \qquad (5)$$

where the number of neighboring points to be weighted over is controlled by a width parameter $\sigma$.

Although smoothing helps to improve (increase) the signal-to-noise ratio (SNR) of the resulting semblance map, it does not utilize the travel time information of the mode associated with a specific slowness. Therefore, it has limited functions in improving the quality of the semblance map. A better way to fully utilized neighboring data points is by using a modified semblance processing method of the disclosed technology. It is understood that although some example procedures are provided herein in the context of DPFS and DPTS processing, (i.e., the modified DPFS and the multi-frequency-band DPTS methods, respectively), it is understood that the disclosed inventive aspects are not limited to DPFS and DPTS. Those of skill in the art will understand that the disclosed processing techniques can be applied to other semblance approaches, for example, the STC method and the WSSM method, without departing from the scope of the disclosed technology.

Figure 4:
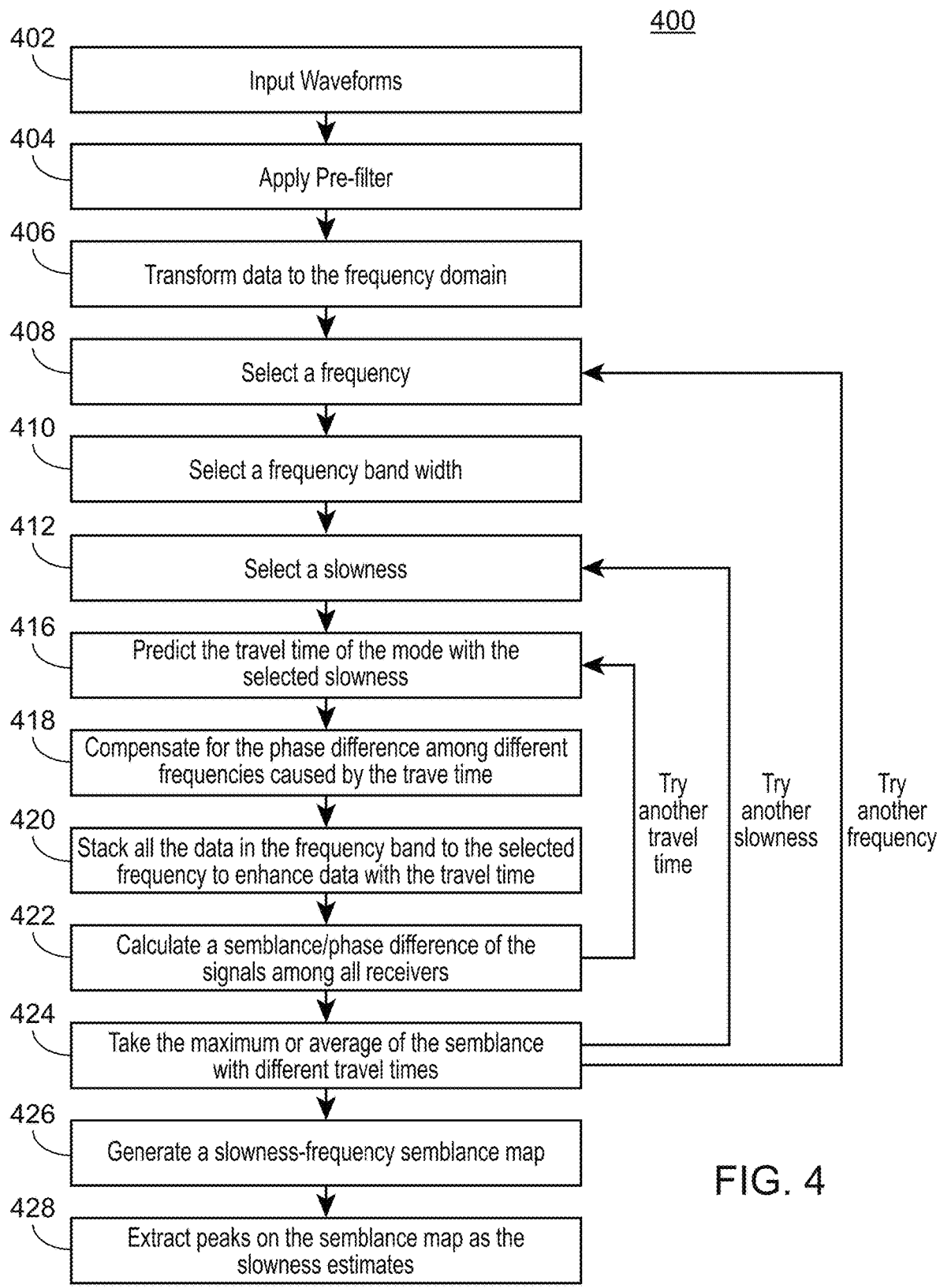
FIG. 4 is an exemplary procedure for identifying and visually presenting formation slowness using a semblance processing technique in the frequency domain, according to some aspects of the invention.

FIG. 4 is an exemplary procedure 400 for identifying and visually presenting formation slowness using a modified semblance/DPFS processing technique in the frequency domain, according to some aspects of the invention. Procedure 400 begins with step 402, in which array waveforms (e.g., response signals) from a sonic logging tool are input into a signal analysis system. In step 404, one or more pre-processing filters are applied to remove noise and other non-targeted signals, before the time-domain waveforms are converted into the frequency domain (step 406).

Next, at step 408, a frequency selection is performed. That is, a first frequency corresponding with a frequency band is selected for which semblance calculations can be performed for various slowness and travel time values (steps 412, and 416, respectively). In some approaches, the selected (first) frequency is a center frequency of the frequency band. As discussed in further detail below, semblance calculations performed for each frequency, slowness, and travel time selection can be used to provided data for one or more pixels in a semblance map. Notably, in contrast to conventional DPFS processing techniques described above, the modified DPFS processing technique of the disclosed technology uses neighboring data points to enhance data quality and enable multimode processing.

After a frequency (e.g., a first frequency or first center frequency) has been selected at step 408, a frequency width (band) can be selected and computed (step 410). The width of the selected frequency band can be computed using various computations, depending on the desired implementation. For example, once a frequency $f_l$ has been selected, then the frequency band can be defined as an interval around $f_l$, for example, as defined by the interval of expression (6):

$$\{f_{l-m}, f_{l+m}\} \qquad (6)$$

In another embodiment, frequency band selection can be performed by computing a multiple of $f_l$. By way of example, 0.7 $f_l$ can be selected as a lower bound, and 1.3 $f_l$ as an upper bound. In some embodiments, the size (width) of the frequency band can be adaptive according to the center frequency, for example, wherein a weighting function is applied to the window so that frequencies close to the central frequency are given a greater weight. It is understood that other computations and/or weighting schemes can be implemented for selection of a given frequency band, without departing from the scope of the disclosed technology.

In step 412, a slowness value can be selected. Next, in step 416, the selected slowness can be used to predict a travel time of a given mode. By way of example, the travel time can be predicted using the relationship of equation (7):

$$TT_j(s) = z_j s + TT_{delay} \qquad (7)$$

where TT(s) represent the travel time, $z_j s$ represent the travel time delay in the formation, $TT_{delay}$ represents both the time delay in the borehole medium and a driving pulse firing delay. In some implementations, $TT_{delay}$ can also account for different traveling times from the source to the first receiver, as well as a time lag of mode generation. Therefore, the predicted travel time might be a range, for example, provided by the interval of expression (8):

$$\{z_j s + TT_{delay1}, z_j s + TT_{delay2}\} \qquad (8)$$

In step 418, compensation for phase differences among different frequencies is accounted for based on the corresponding travel time. In some implementations, by assuming that all data in the selected frequency band have the same arrival time, phase differences between frequencies can be accounted for using the arrival time prediction. By way of example, the signal phase at frequency $f_l$, can be predicted based on signals at different frequencies in the same band, for example, using the relationship of equation (9):

$$XX_j(f_k, f, TT_j) = X_j(f) \exp(i2\pi(f - f_l)sTT_j) \qquad (9)$$

In step 420, all data in the current frequency band is stacked to the current frequency, for example, to enrich the data with the travel time information. In some approaches, stacking the predicted signals serves to improve the signal-to-noise ratio (SNR) of the signal with the travel time $TT_j$, as provided by the relationship of equation (10):

$$XXX_j(f_l, TT_j) = \frac{1}{2m+1} \sum_{q=l-m}^{l+m} W(f_q, f_m) XX_j(f_l, f_q, TT_j) \qquad (10)$$

Note that the weighting interval—$W(f_q, f_m)$—can be expressed in other forms, and is not limited to the relationship provided equation (5), above. Additionally, $W(f_q, f_m)$ can be an optimized (e.g., smooth) window, and also used to separate waves with different arrival times. In other words, smoothing can be used as a way to decrease the edge effects or Gibbs phenomenon to better identify each mode.

In alternative embodiments, the stacking performed in step 420 can be performed only on the phase of the data, for example, as provided by equation (11):

$$XXX_j(f_l, TT_j) = \frac{1}{2m+1} \sum_{q=l-m}^{l+m} \frac{W(f_q, f_m) XX_j(f_l, f_q, TT_j)}{|XX_j(f_l, f_q, TT_j)|} \qquad (11)$$

where, $XXX_j(f_l, TT_j)$ is the reconstructed wave spectrum, which includes travel time information of the target mode. In some implementations, phase stacking, as provided in the example of equation (11), can produce a better SNR than the raw spectrum $X_j(f)$. Further, different waves often have different arrival times. Thus they are separated in $XXX_j(f_l, TT)$. Substitute the new spectrum into equations (1) and (2), we get equation (12):

$$\phi(f, s, TT) = \frac{2 \sum_{j=1}^{j=N-1} \sum_{k=j+1}^{k=N} |\tan^{-1}[XX_j(f_l, TT_j)\exp(i2\pi fs(z_r - z_j))] - \tan^{-1}[XXX_k(f_l, TT_j)\exp(i2\pi fs(z_r - z_k))]|}{N(N+1)} \qquad (12)$$

where $\phi(f, s, TT)$ is the phase difference associated with frequency, slowness and the travel time TT at the reference receiver.

In step 422, the semblance/phase difference value is obtained. In some implementations, semblance/phase difference values are calculated using the relationship of equation (13):

$$Semb'(f, s, TT) = \left|1 - \frac{2\phi(f, s, TT)}{\pi}\right| \qquad (13)$$

Once semblance/phase difference values are determined for the travel time predicted in step 416, additional semblance/phase difference values can be computed for other travel times. That is, step 422 can revert back (loop) to step 416, until processing steps 416-422, are completed for all travel time predictions, e.g., for various modes of the selected slowness. Once all predicted travel times have been processed using steps 416-422, process 400 proceeds to step 424.

In step 424, maximum and/or average semblance data for various travel times are selected. In some implementations, the resulting 3D data can be projected into the slowness-frequency domain by taking the maximum semblance values along the travel time axis, for example, as provided by the relationship of equation (14):

$$Semb(f, s) = \max_{TT} Semb'(f, s, TT) \qquad (14)$$

In an alternative embodiment, the resulting 3D data can be projected into the slowness-frequency domain by taking averages at different travel times. By way of example, averaged semblance values may be computed using the relationship of equation (15):

$$Semb(f, s) = \frac{1}{LTT} \sum_{TT} Semb'(f, s, TT) \qquad (15)$$

where LTT represents the data point amount on travel time axis.

Once semblance calculations of step 424 have completed for the corresponding slowness value and various travel times (e.g., steps 416-422), then new slowness values can be selected. Specifically, step 424 can revert (loop) back to step 412 in which a new (subsequent) slowness value is selected for the currently selected frequency (from step 408).

After processing for the new slowness value has completed (e.g., steps 416-424) a similar loop can be performed for other frequency selections, i.e., by sweeping through additional frequencies. For example, after semblance calculations of step 424 have been completed for a current frequency selection (e.g., a first frequency value selected at step 408), and all corresponding slowness value/s (e.g., steps 412-424), and travel time/s (e.g., steps 416-422), then a new frequency value (e.g., a second frequency value) can be selected. Specifically, step 424 can revert (loop) back to step 408 in which a new (subsequent) frequency value selected. After semblance data has been generated by iterative processing across all frequency selections (step 408), slowness selections (step 412), and travel time predictions (step 416), the resulting data can be used to generate a slowness-frequency semblance map (step 426).

In step 428, extracting peaks on the map yields multiple slowness dispersions at different frequencies. These peaks can be used to identify slowness estimates.

In some embodiments, the disclosed technology encompasses techniques for performing multi-mode differential phase semblance processing for time-domain signals, i.e., differential phase time semblance processing (DPTS).

In some time-domain processing approaches, instead of stacking data in the frequency domain, neighboring frequency data is combined with a multi-frequency-band time-domain processing and a slowness-time MASK.

Figure 5A:
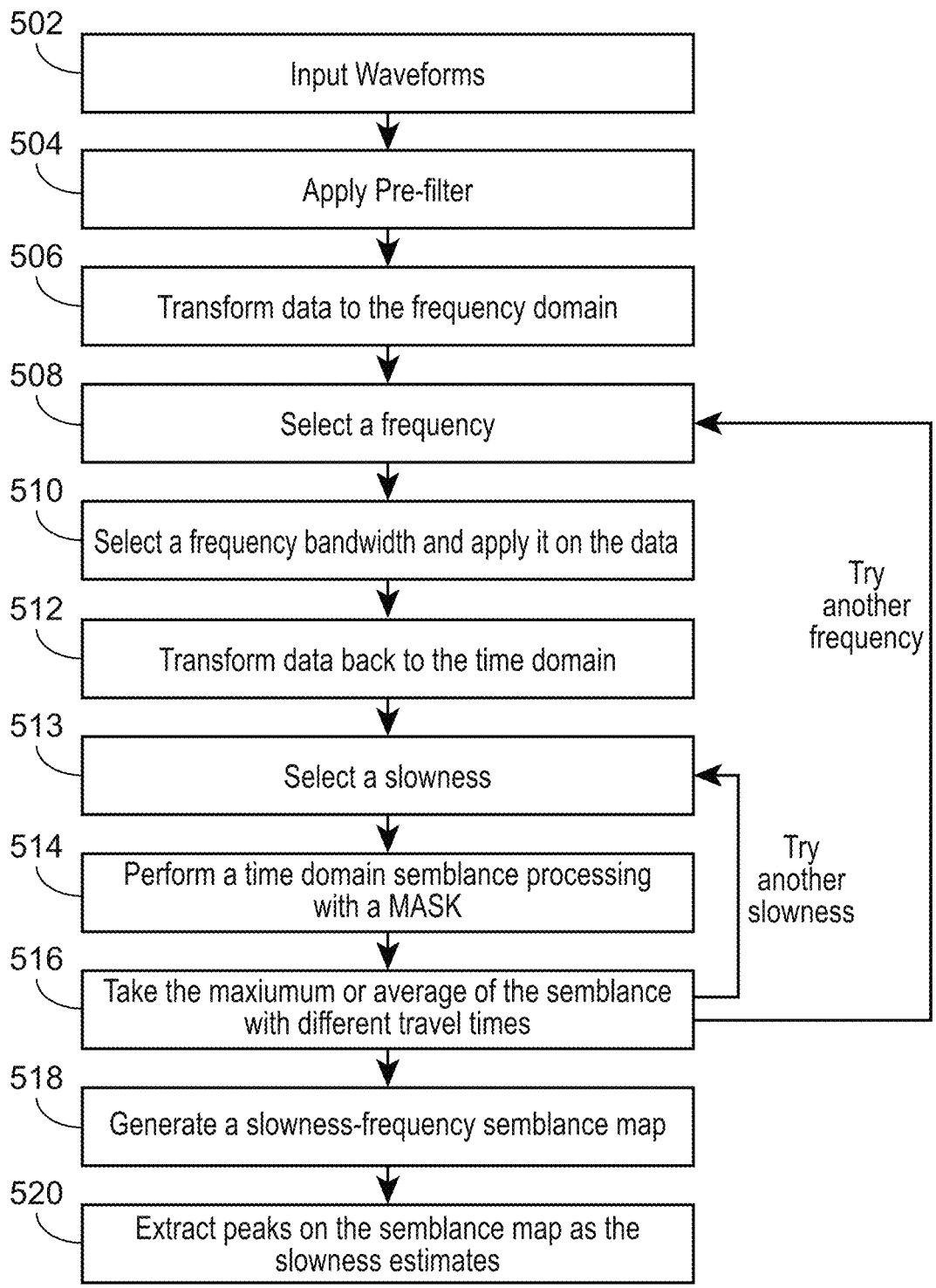
FIG. 5A is an exemplary procedure for identifying and visually presenting formation slowness using a semblance processing technique in the time-domain using a frequency filter, according to some aspects of the invention.

FIG. 5A is an exemplary procedure 500 for identifying and visually presenting formation slowness using a modified DPTS processing technique in the time-domain, according to some aspects of the invention. Procedure 500 begins with step 502, in which input waveforms are provided to a signal analysis system. In step 504, one or more pre-processing filters are applied to remove noise and other non-targeted signals.

Next, at step 508, a frequency (e.g., a center frequency) selection is performed. In some aspects, frequency selections are looped e.g., over steps 510-516, discussed below. Once a frequency selection is made in step 508 then frequency filtering is performed by applying a frequency band (e.g., pass band), wherein a lower and upper bound of the band are centered about the selected frequency (e.g., a first frequency, a second frequency, etc.). After frequency filtering is performed with the selected band (step 510), the frequency domain spectrum can be converted back to the time-domain, for example, in which neighboring frequency data are combined (step 512). In some implementations, during this process, a proper frequency filter needs to be applied to avoid edge effects in the time-domain. Then, time-domain processing, for example, DPTS, is utilized to generate a slowness-TT (travel time) semblance. In some implementations of the DPTS process 500, aliases can be removed so as to avoid later stacking during the later stacking process.

In step 513, a slowness (slowness value) is selected, and processing is subsequently performed (steps 514-516) by looping over the selected slowness, until all slowness selections have been processed.

In step 514, a slowness-time MASK can be created from the predicted travel time of the waves, for example, using equation (8), described above, and applied to the resulting semblance map. In such approaches, the pre-known travel time information is utilized to enhance (increase) the SNR, and enable multimode detection function.

$$\text{Semb}'(f,s,TT) \tag{16}$$

In step 516, maximum and/or average semblance data for various travel times are selected. As discussed above, the resulting 3D data can be projected into the slowness-frequency domain by taking the maximum semblance values along the travel time axis, for example, as provided by the relationship of equation (14), discussed above. In step 516, iterative processing for the other selected slowness values can be performed, for example, by looping back to step 513. Once all slowness values for a given frequency selection have been processed, then iterative processing for other selected frequencies can be performed, for example, by looping back to step 508. This iterative process can continue until semblance calculations (step 516) have been processed for all possible slowness and frequency selections.

After semblance data has been generated by iterative processing across all frequency selections (step 516) the resulting data can be used to generate a slowness-frequency semblance map (step 518).

Additionally, in step 520, extracting peaks on the map yields multiple slowness dispersions at different frequencies. These peaks can be used to identify slowness estimates.

Notably, in some aspects, instead of applying the selected frequency band with forward and inverse Fourier transforms, the frequency band can be used to construct a digital filter, for example, that can be applied the time-domain.

Figure 5B:
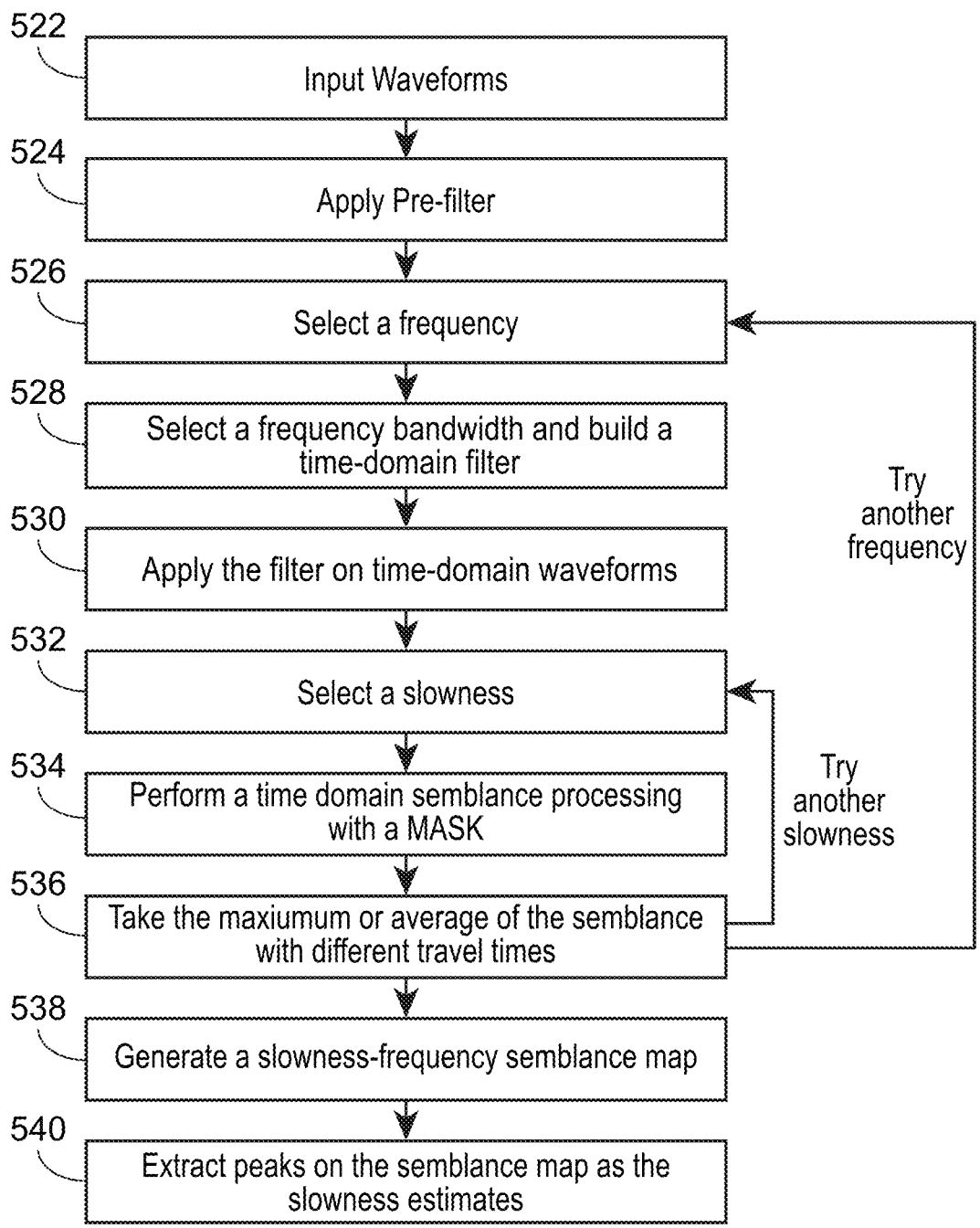
FIG. 5B is an exemplary procedure for identifying and visually presenting formation slowness using a semblance processing technique in the time-domain using a time-domain waveform filter, according to some aspects of the invention.

FIG. 5B is an exemplary procedure 501 for identifying and visually presenting formation slowness using a modified DPTS processing technique in the time-domain, with a time-domain digital filter, according to some aspects of the invention. Procedure 500 begins with step 522, in which input waveforms are provided to a signal analysis system. In step 524, one or more pre-processing filters are applied to remove noise and other non-targeted signals.

Next, at step 526, a frequency (e.g., a center frequency) selection is performed. In some aspects, frequency selections are looped e.g., over steps 528-536, discussed below.

Once a frequency selection is made in step 526 then a frequency band is selected and a time-domain filter is constructed (step 528).

Next, at step 530, the time-domain filter constructed in step 528 is applied to the time-domain waveforms. In step 532, a slowness (e.g., a slowness value) is selected, and processing is subsequently performed by looping over the selected slowness, until all slowness selections have been processed e.g., steps 532-536.

In step 534, time-domain semblance processing is performed using a slowness-time MASK created from the predicted travel time of the waves, for example, using equation (8), described above, and applied to the resulting semblance map. In such approaches, the pre-known travel time information is utilized to enhance (increase) the SNR, and enable multimode detection function, as further discussed above with respect to equation (16).

In step 536, maximum and/or average semblance data for various travel times are selected. As discussed above, the resulting 3D data can be projected into the slowness-frequency domain by taking the maximum semblance values along the travel time axis, for example, as provided by the relationship of equation (14), discussed above.

Additionally, in step 536, iterative processing for the other selected slowness values can be performed, for example, by looping back to step 532. Once all slowness values for a given frequency selection have been processed, then iterative processing for other selected frequencies can be performed, for example, by looping back to step 526. This iterative process can continue until semblance calculations (step 516) have been processed for all possible slowness and frequency selections. After semblance data has been generated by iterative processing across all frequency selections the resulting data can be used to generate a slowness-frequency semblance map (step 538). In step 540, map peaks are extracted to yield multiple slowness dispersions at different frequencies. As discussed above, these peaks can be used to identify slowness estimates.

Figure 6A:
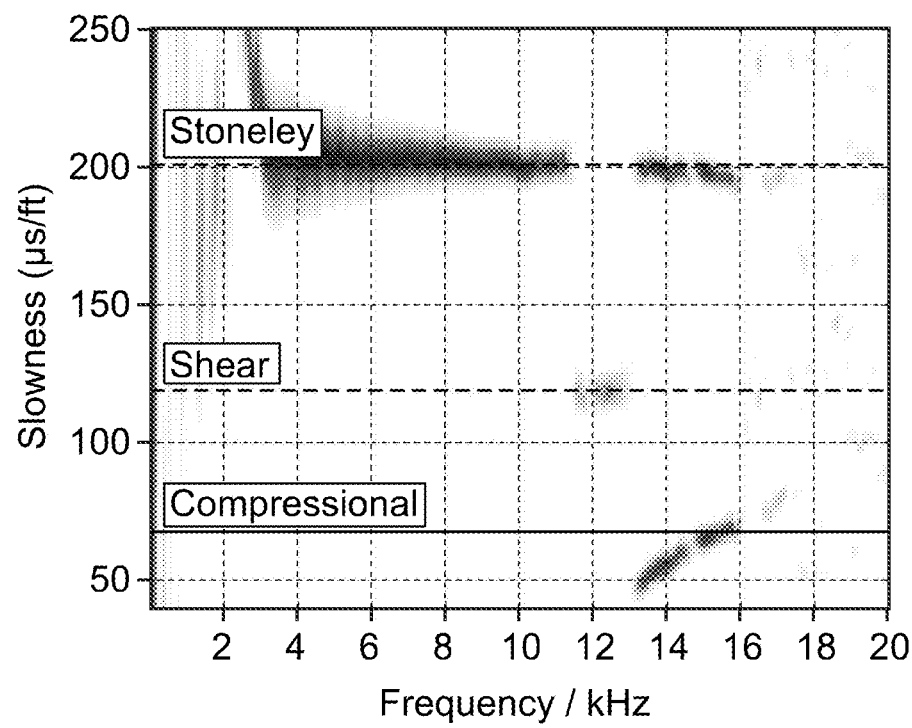
FIG. 6A is a semblance map, graphically representing frequency vs. slowness for processing performed using a conventional DPFS processing technique.
Figure 6B:
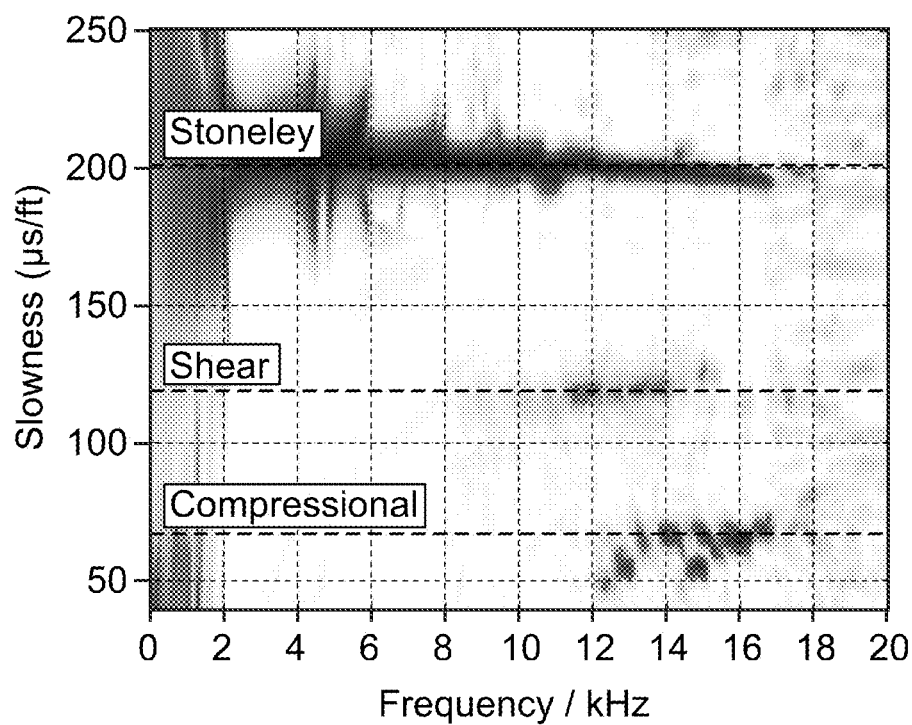
FIG. 6B is a semblance map, graphically representing frequency vs. slowness for a multi-mode frequency-domain semblance processing technique, according to some aspects of the invention.
Figure 6C:
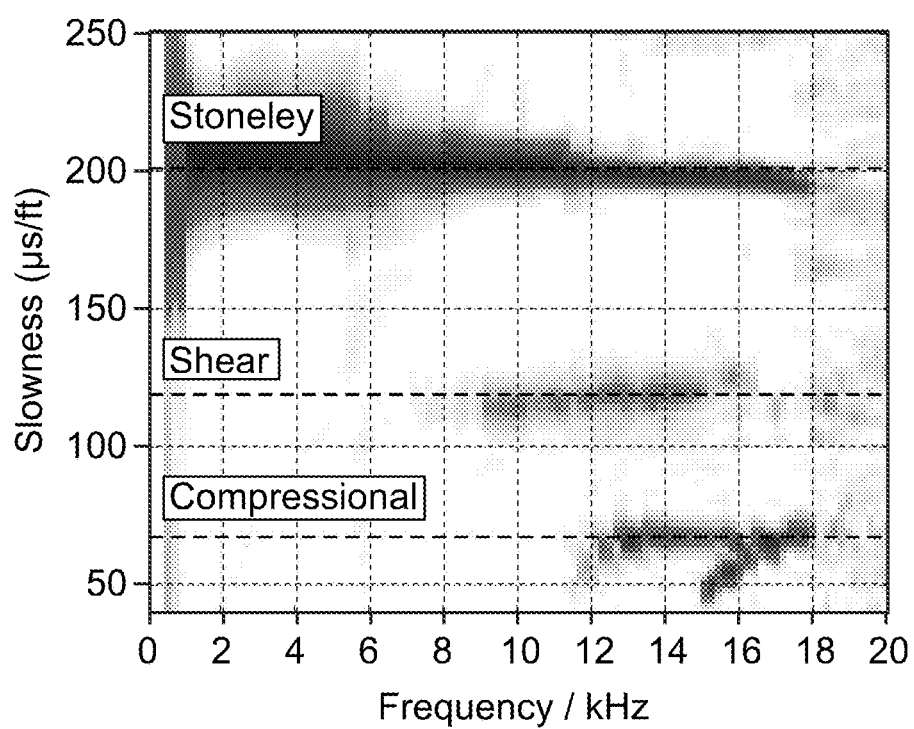
FIG. 6C is a semblance map, graphically representing frequency vs. slowness for a multi-mode time-domain semblance processing technique, according to some aspects of the invention.

FIGS. 6A-6C are a coherence maps, graphically representing frequency vs. slowness for processing performed using a conventional DPFS processing technique (FIG. 6A), a modified DPFS technique of the current invention (FIG. 6B), and a multi-frequency-band DPTS technique of the disclosed technology (FIG. 6C). In particular, FIGS. 6A-6C graphically illustrate some differences between conventional DPFS and modified DPFS results for monopole wave data.

In particular, it is noted that few shear waves are observable in the conventional DPFS map of FIG. 6A. In contrast, shear waves are clearly evident in the modified DPFS map of FIG. 6B. Comparisons between FIGS. 6A and 6B indicate that the modified DPFS techniques of the subject technology can present multimode estimates as an improved method of monopole processing QC.

FIG. 6C shows a graphical example results obtained from a DPTS technique of the disclosed technology, outlined in process 500 discussed with respect to FIG. 5. That is, FIGS. 6B and 6C suggest that the quality of all three wave slowness estimates (compressional, shear, and Stoneley) can be improved using improved DPFS and DPTS processing techniques, as compared to conventional DPFS processing.

Figure 7A:
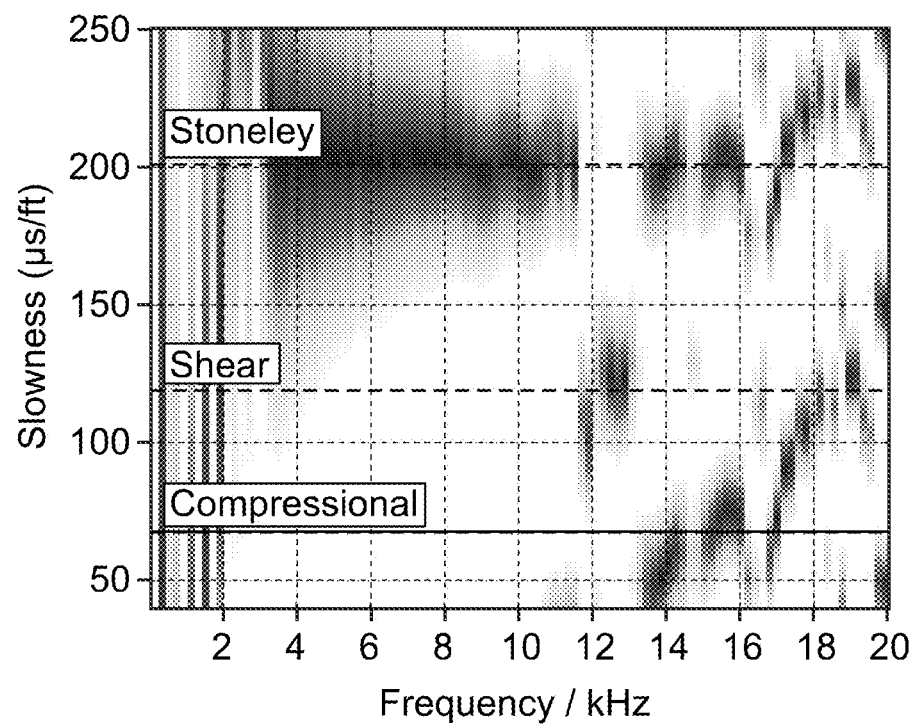
FIG. 7A is a semblance map, graphically representing frequency vs. slowness for a conventional DPFS processing technique.

FIG. 7A is a coherence map, graphically representing frequency vs. slowness for a conventional DPFS processing technique. For comparison, FIG. 7B is a coherence map, graphically representing frequency vs. slowness for a multi-frequency band DPTS processing technique, according to some aspects of the disclosed technology.

Figure 7B:
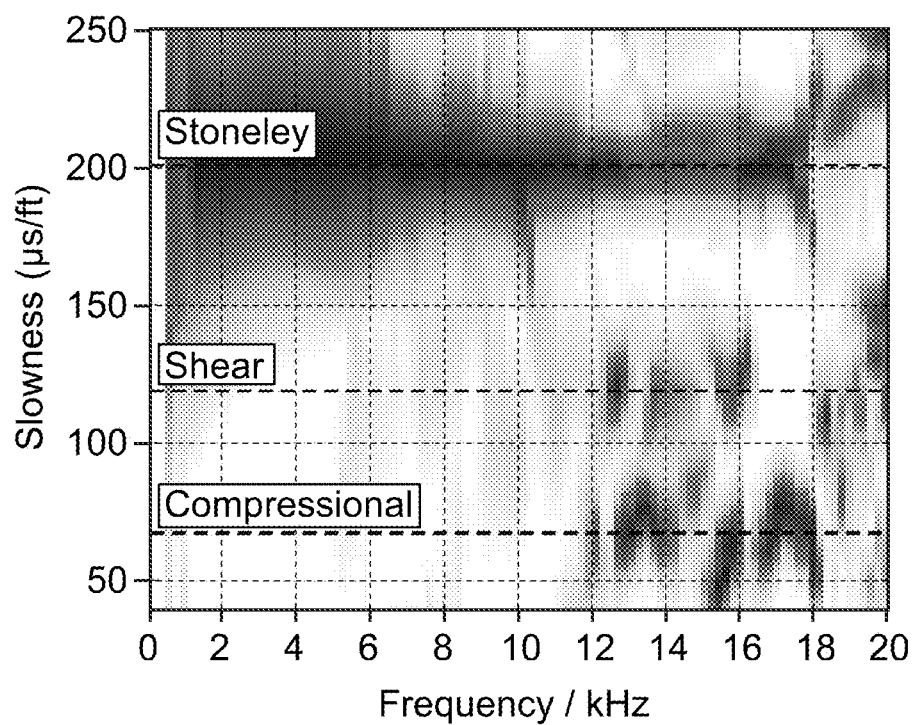
FIG. 7B is a coherence map, graphically representing frequency vs. slowness for a multi-mode time-domain semblance processing technique, according to some aspects of the invention.

Markedly, FIG. 7B illustrates an additional benefit of the disclosed processing methods, namely, that the number of detected modes is not constrained by receiver number. By way of example, if there are only three waveforms, traditional multi-mode processing methods (e.g., matrix-pencil and/or Prony) are limited to predicting a number of modes that is less than half of the receiver number. That is, for a three receiver array, the matrix-pencil and/or Prony methods can only predict a single mode.

In contrast, the disclosed modified DPFS and DPTS processing methods are not limited by receiver number. For example, FIGS. 7A and 7B show the results of processing the first three waveforms for wireline monopole data by conventional DPFS (FIG. 7A) and the multi-frequency band DPTS method (FIG. 7B), respectively. Notably, all the three modes are detected by the multi-frequency band DPTS method, as illustrated in FIG. 7B, while conventional DPFS processing presents only a single mode at each frequency, as shown in FIG. 7A.

Figure 8A:
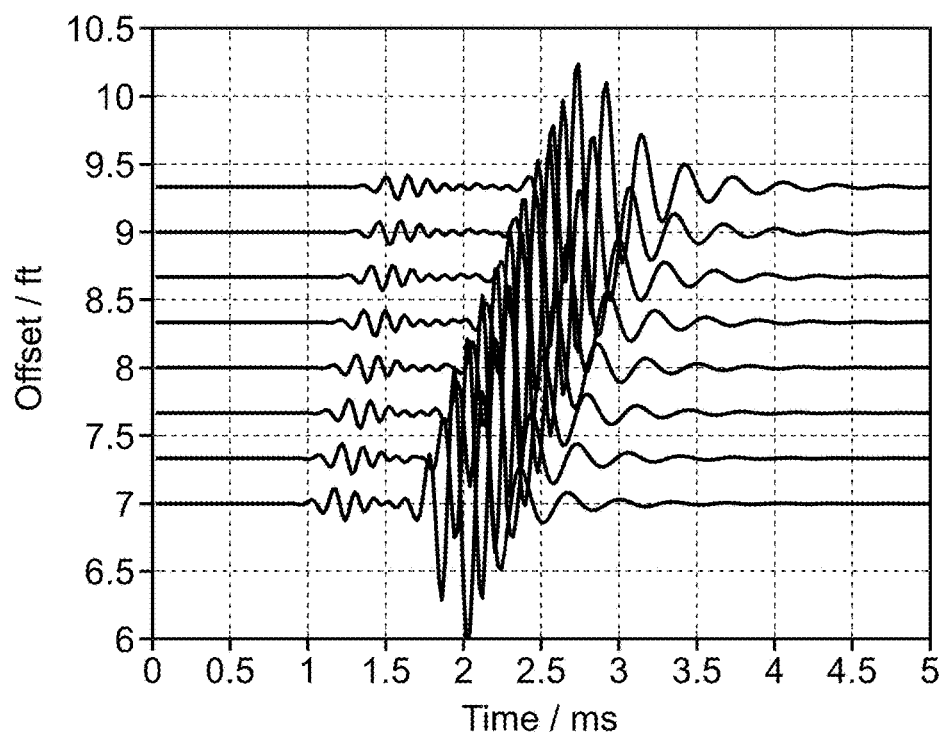
FIG. 8A is waveform map, graphically representing time vs. offset for a plurality of synthetic waveforms.

FIG. 8A is a waveform display map, graphically representing time vs. offset for a plurality of synthetic LWD quadrupole waveforms.

Figure 8B:
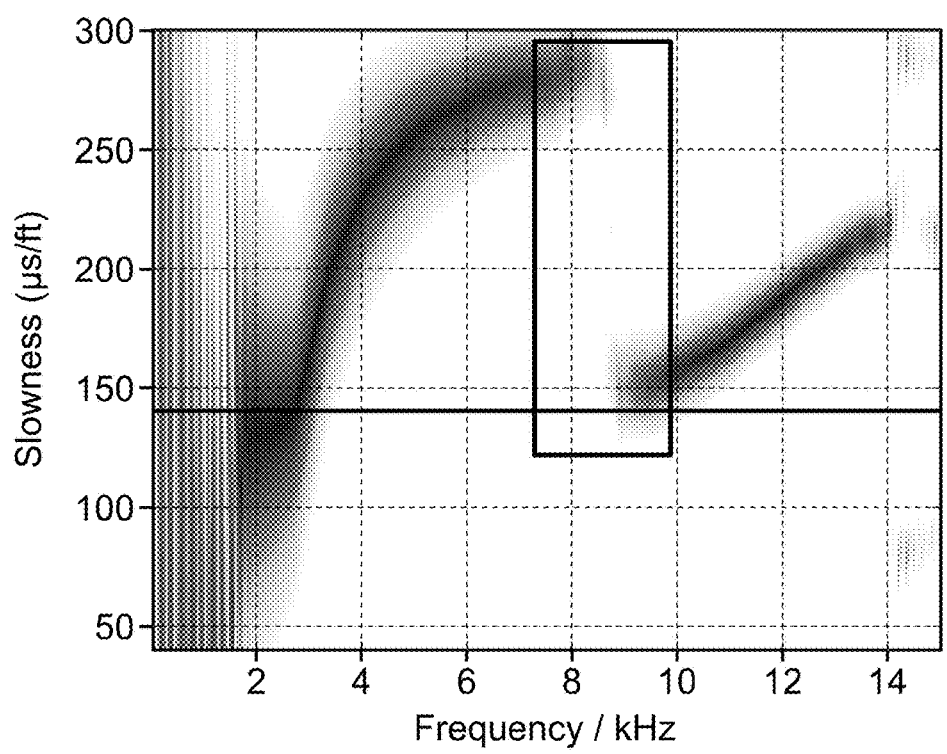
FIG. 8B is a semblance map, graphically representing frequency vs. slowness for a conventional DPFS processing technique.

FIG. 8B is semblance map, graphically representing frequency vs. slowness for a conventional DPFS processing technique (FIG. 8B). In contrast, FIGS. 8C-FIG. 8D are semblance maps for a modified DPFS processing technique (FIG. 8C), and a multi-frequency band DPTS processing technique (FIG. 8D), according to some aspects of the invention.

Figure 8C:
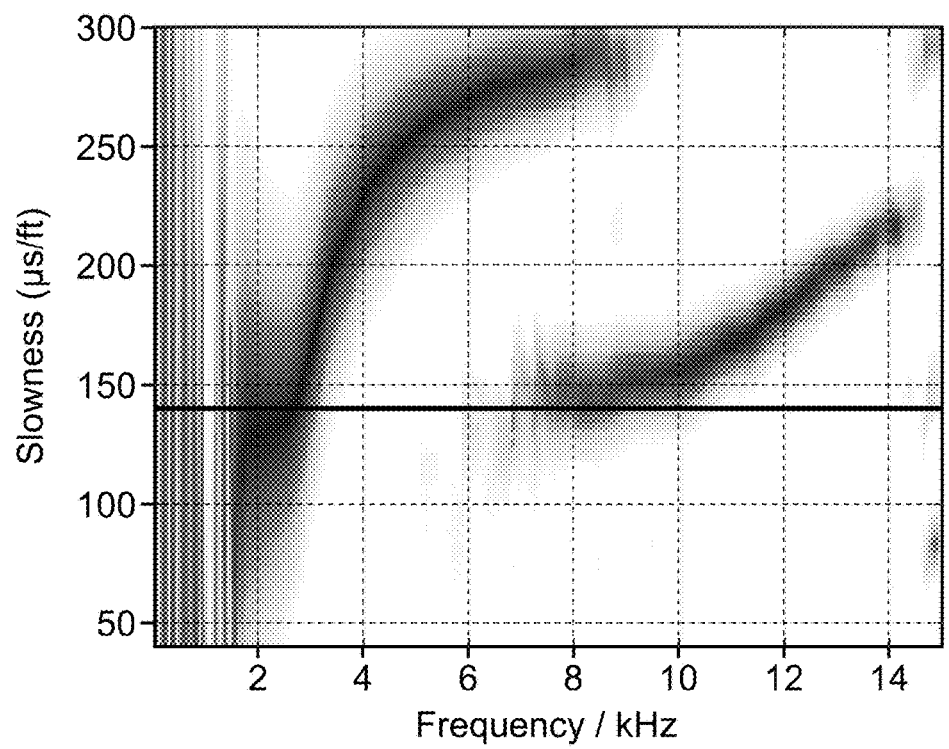
FIG. 8C is a semblance map, graphically representing frequency vs. slowness for a multi-mode frequency-domain processing technique, according to some aspects of the invention.
Figure 8D:
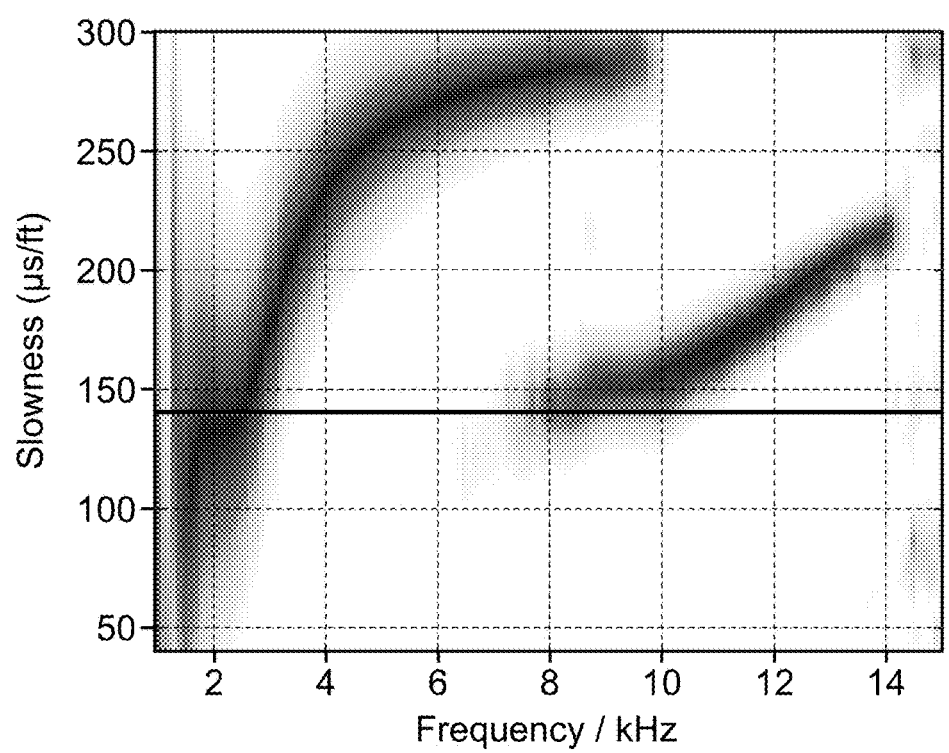
FIG. 8D is a semblance map, graphically representing frequency vs. slowness for a multi-mode time-domain processing technique, according to some aspects of the invention.

In particular, FIGS. 8B-8D, all provide examples of dispersion processing performed for synthetic LWD quadrupole data, for example, represented by synthetic waveforms in FIG. 8A. Notably, the conventional DPFS map of FIG. 8B only illustrates a single mode in the area indicated by the rectangle. In contrast, the modified DPFS of FIG. 8C, and multi-frequency band DPTS of FIG. 8D show both the first and the second screw waves in the corresponding area.

Figure 9A:
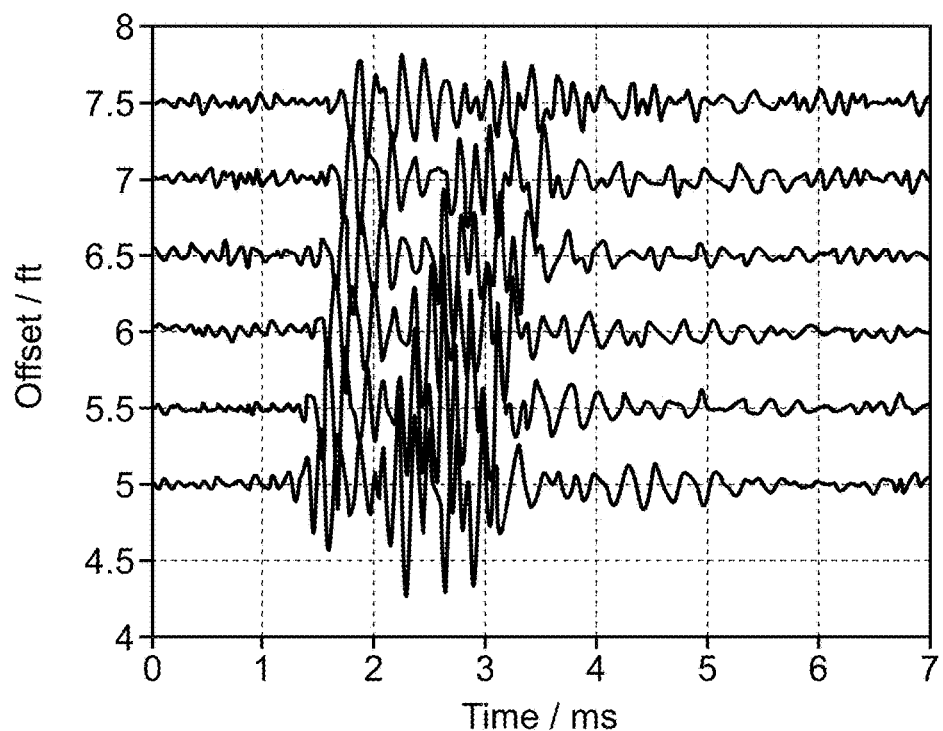
FIG. 9A is a waveform map, graphically representing time vs. offset for a plurality of raw waveforms from field data.
Figure 9B:
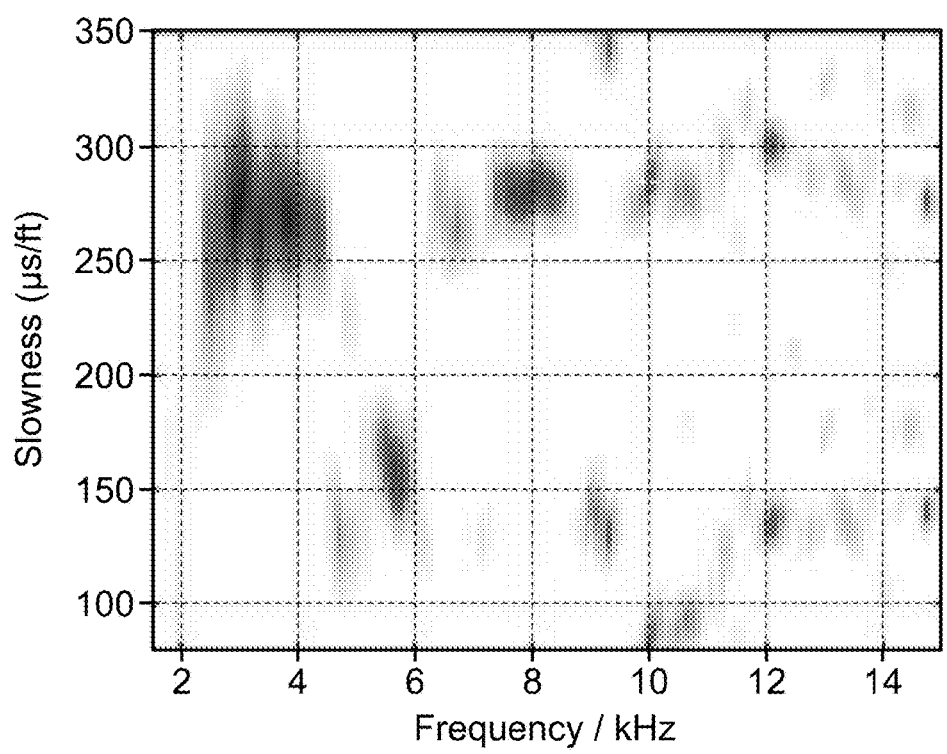
FIG. 9B is semblance map, graphically representing frequency vs. slowness for a conventional DPFS processing technique.

FIG. 9A is a waveform display map, graphically representing time vs. offset for a plurality of raw waveforms. For example, the raw waveforms can be processed to produce FIG. 9B, which is a semblance map, graphically representing frequency vs. slowness for a conventional DPFS processing technique.

Figure 9C:
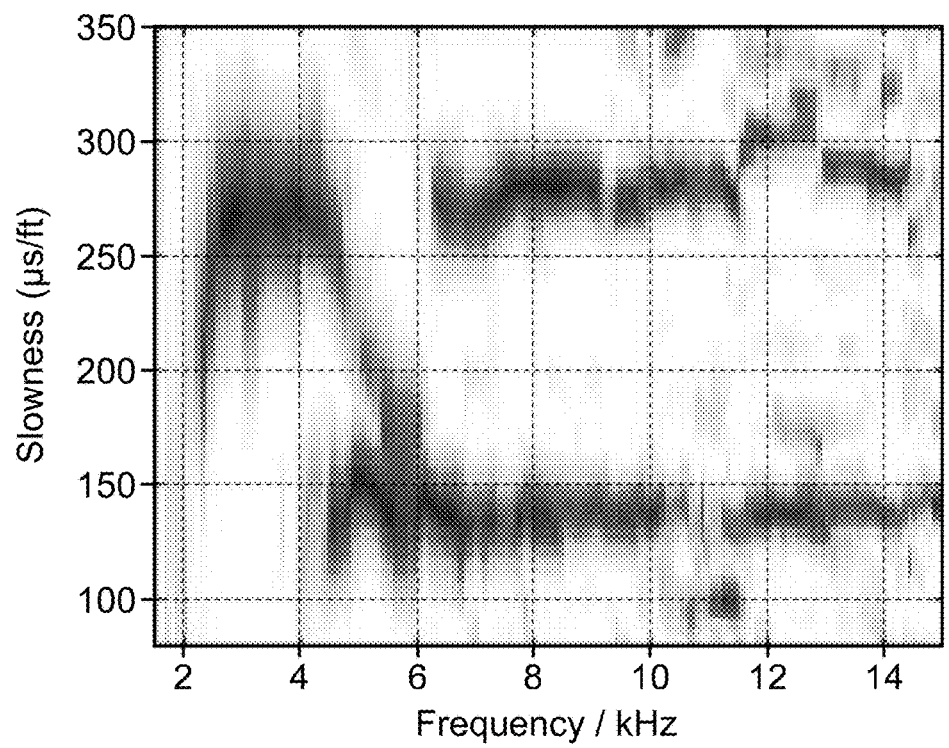
FIG. 9C is a semblance map, graphically representing frequency vs. slowness for a multi-mode frequency-domain processing technique, according to some aspects of the technology.
Figure 9D:
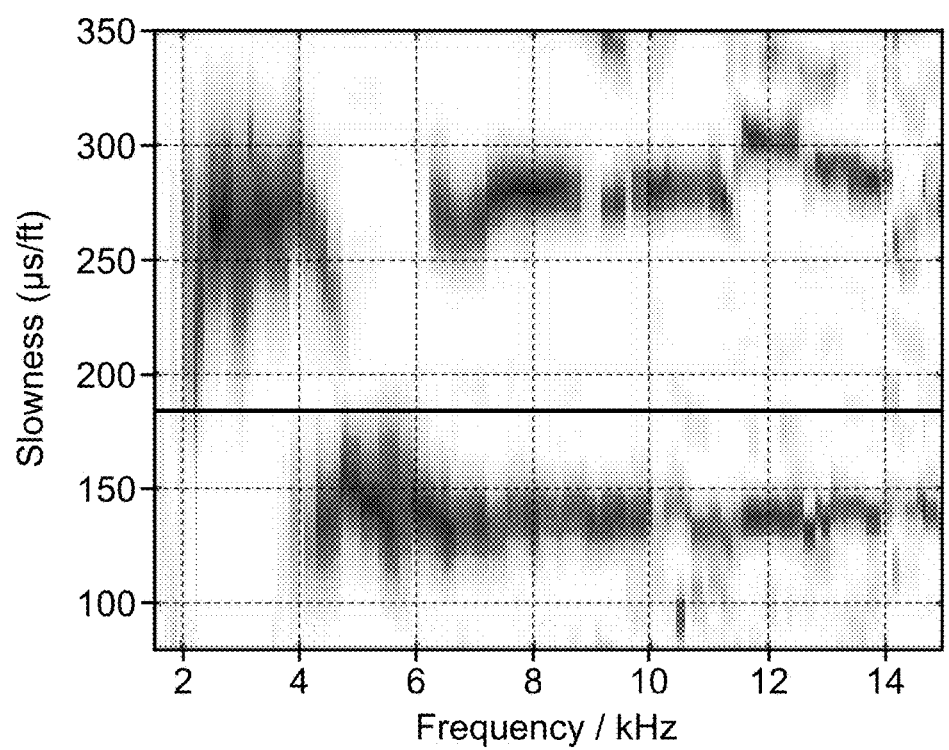
FIG. 9D is a semblance map, graphically representing frequency vs. slowness for a multi-mode time-domain processing technique, according to some aspects of the technology.

FIGS. 9C-9D are semblance maps, graphically representing frequency vs. slowness for a modified DPFS processing technique (FIG. 9C) and a multi-frequency-band DPTS processing technique (FIG. 9D), according to some aspects of the technology. The graphics produced by the improved processing methods corresponding with FIGS. 9C and 9D illustrate further advantages of the disclosed technology. For example, in FIG. 9B, only low frequency portions of the first screw wave are observable. In contrast, for LWD quadrupole data processed using the modified DPFS technique, illustrated by FIG. 9C, and multi-frequency-band DPTS processing technique, illustrated by FIG. 9D, broadband and continuous slowness estimates are observable for both the first and second waves.

In yet another aspect of the disclosed technology, combined processing methods to produce enhanced semblance maps are contemplated. For example, in some aspects, combining single mode and multi-mode semblance processing, according to some aspects of the invention, can be used to yield a final dispersion result that is optimized by the two techniques. In one implementation, the single mode semblance map may be stable, and used to present information pertaining to the primary mode. As such, single-mode processing technique can be used to extract the slowness of the primary mode. However, the multimode semblance map may be used to provide more details of the weaker waves, e.g., those corresponding with the second or third modes. As such, in some approaches, final dispersion of all modes might be optimized by combining the two maps, wherein the maximum value of the two maps might be selected and outputted as the final QC metrics.

Figure 10:
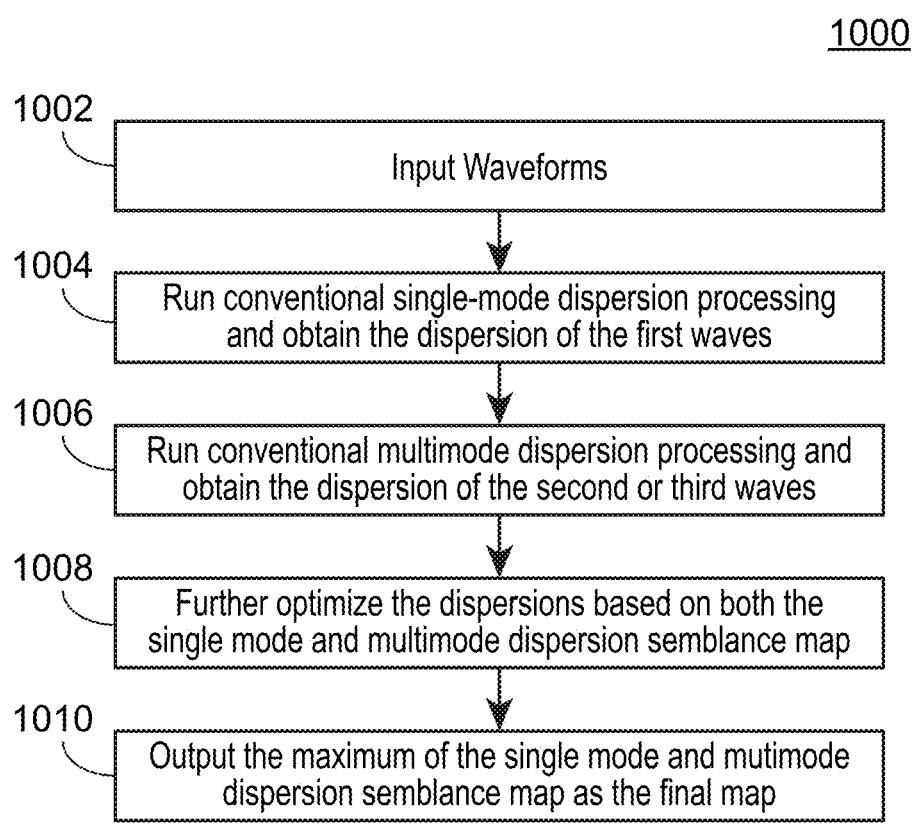
FIG. 10 is an exemplary procedure for combining single-mode and multi-mode semblance processing, according to some aspects of the invention.

FIG. 10 is an exemplary procedure 1000 for combining single-mode and multi-mode semblance processing, according to some aspects of the invention. Procedure 1000 begins with step 1002 in which array waveforms (e.g., response signals) from a sonic logging tool are input into a signal analysis system.

In step 1004, single-mode dispersion processing is performed to obtain dispersion data for the first waves.

Subsequently, in step 1006, multimode dispersion processing is used to obtain dispersion data for second and/or third waves, etc.

In step 1008, the dispersion data obtained in steps 1004 and 1006 is further optimized. For example, dispersion values may be selected from each set of dispersion data.

Next, in step 1010, the maximum values of the single mode and multimode semblance map data is used to generate a final (combined) semblance map.

Figure 11:
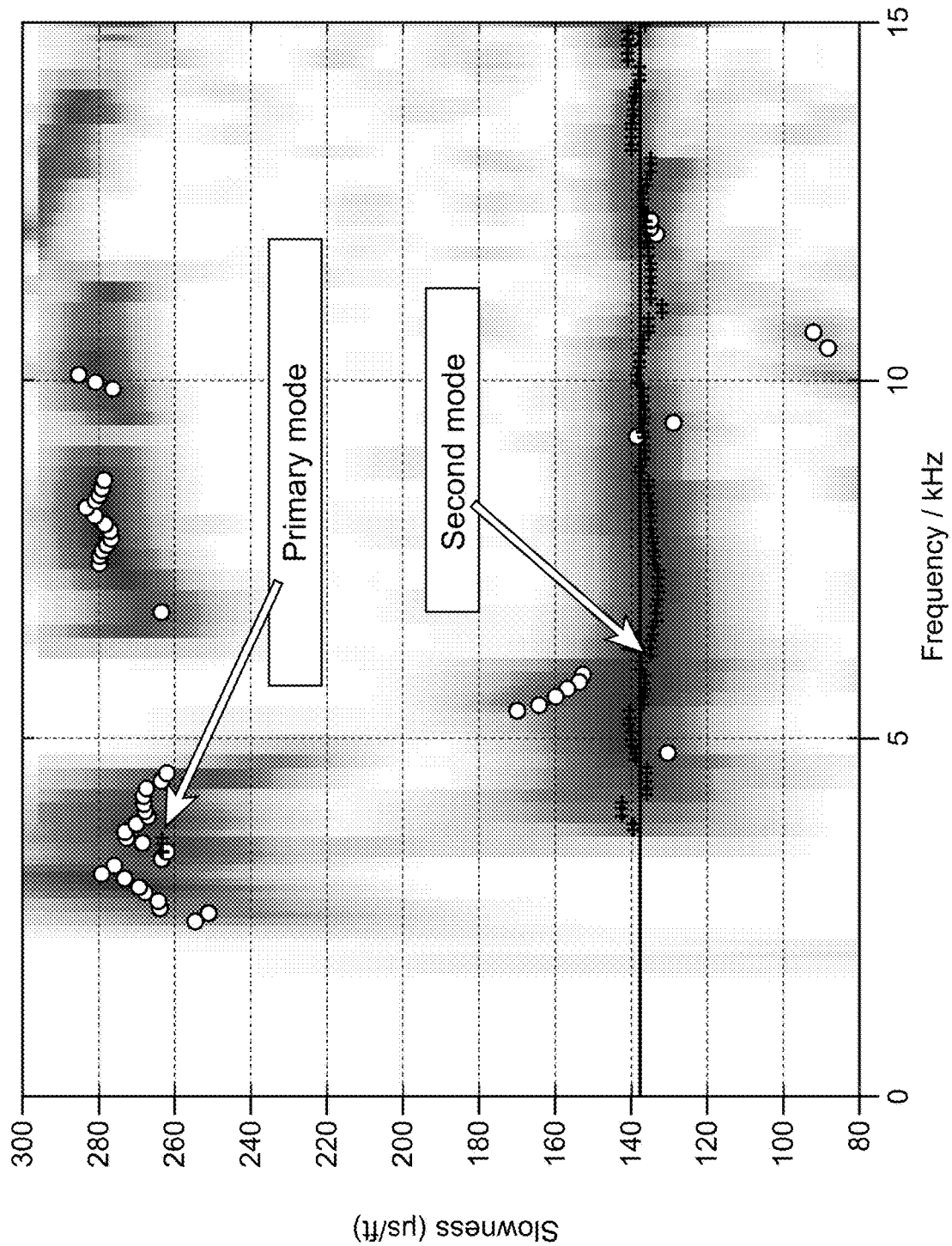
FIG. 11 is a semblance map, graphically representing frequency vs. slowness for combined single-mode and multi-mode processing, according to some aspects of the invention.

FIG. 11 is a semblance map, graphically representing frequency vs. slowness for combined DPFS and DPTS processing, according to some aspects of the invention. More specifically, FIG. 11 shows an example of combining the single mode processing and the multi-mode semblance processing techniques discussed above. The primary mode is extracted from a semblance map by conventional DPFS, while the second mode is determined by a multi-frequency-band DPTS. The maximum value of the maps from the two processing is displayed as the background for QC purposes.

Figure 12:
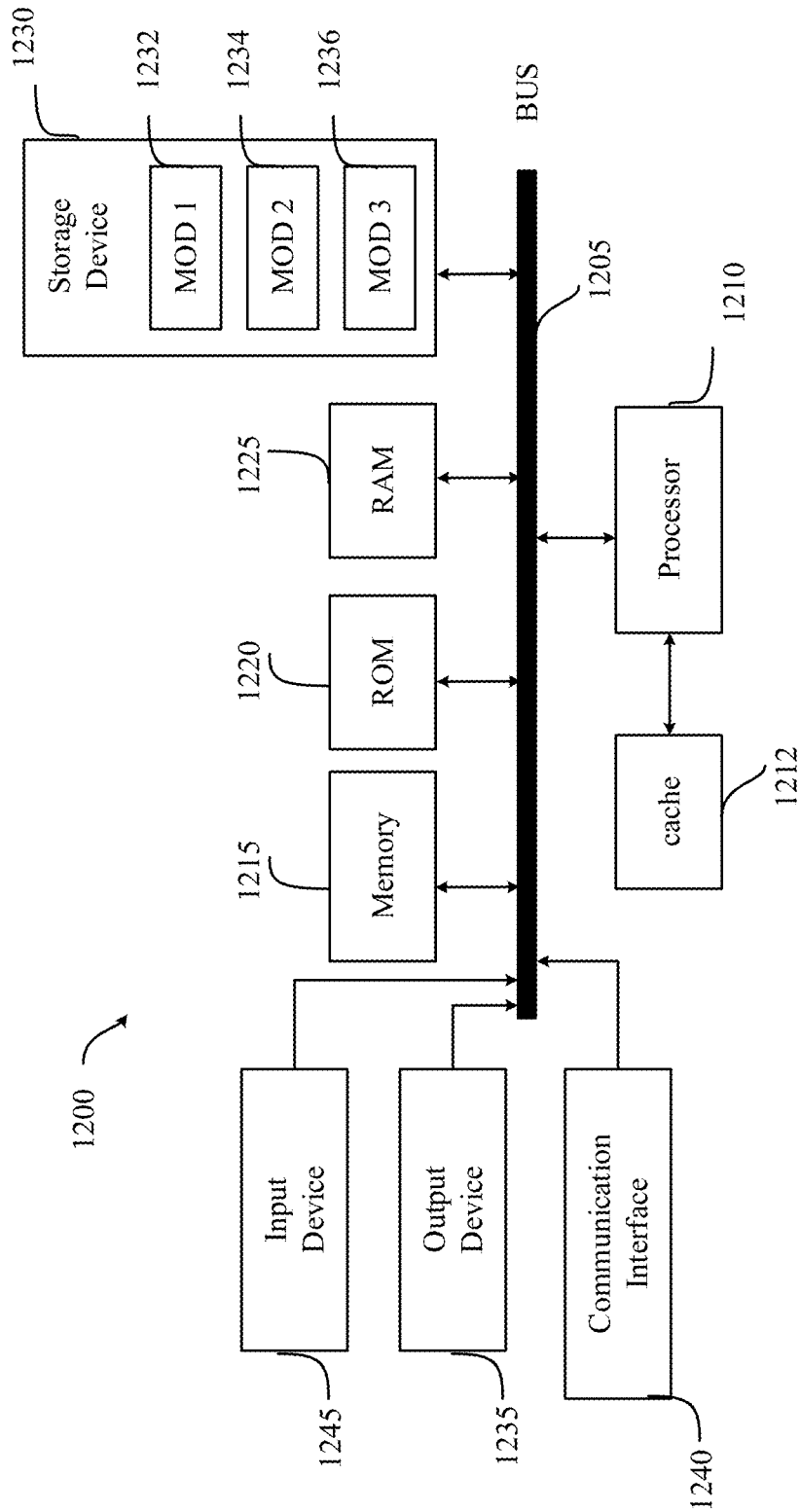
FIG. 12 is a schematic diagram of an example system embodiment.

FIG. 12 illustrates an exemplary computing systems for use with example tools and systems (e.g., downhole tool 26, downhole tool 34, surface equipment, and the like). The more appropriate embodiment will be apparent to those of ordinary skill in the art when practicing the present technology. Persons of ordinary skill in the art will also readily appreciate that other system embodiments are possible.

Specifically, FIG. 12 illustrates system architecture 1200 wherein the components of the system are in electrical communication with each other using a bus 1205. System architecture 1200 can include a processing unit (CPU or processor) 1210, as well as a cache 1212, that are variously coupled to system bus 1205. Bus 1205 couples various system components including system memory 1215, (e.g., read only memory (ROM) 1220 and random access memory (RAM) 1235), to processor 1210. System architecture 1200 can include a cache of high-speed memory connected directly with, in close proximity to, or integrated as part of the processor 1210. System architecture 1200 can copy data from the memory 1215 and/or the storage device 1230 to the cache 1212 for quick access by the processor 1210. In this way, the cache can provide a performance boost that avoids processor 1210 delays while waiting for data. These and other modules can control or be configured to control the processor 1210 to perform various actions. Other system memory 1215 may be available for use as well. Memory 1215 can include multiple different types of memory with different performance characteristics. Processor 1210 can include any general purpose processor and a hardware module or software module, such as module 1 (1232), module 2 (1234), and module 3 (1236) stored in storage device 1230, configured to control processor 1210 as well as a special-purpose processor where software instructions are incorporated into the actual processor design. Processor 1210 may essentially be a completely self-contained computing system, containing multiple cores or processors, a bus, memory controller, cache, etc. A multi-core processor may be symmetric or asymmetric.

To enable user interaction with the computing system architecture 1200, an input device 1245 can represent any number of input mechanisms, such as a microphone for speech, a touch-sensitive screen for gesture or graphical input, keyboard, mouse, motion input, speech and so forth. An output device 1242 can also be one or more of a number of output mechanisms. In some instances, multimodal systems can enable a user to provide multiple types of input to communicate with the computing system architecture 1200. The communications interface 1240 can generally govern and manage the user input and system output. There is no restriction on operating on any particular hardware arrangement and therefore the basic features here may easily be substituted for improved hardware or firmware arrangements as they are developed.

Storage device 1230 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1235, read only memory (ROM) 1220, and hybrids thereof.

Storage device 1230 can include software modules 1232, 1234, 1236 for controlling the processor 1210. Other hardware or software modules are contemplated. The storage device 1230 can be connected to the system bus 1205. In one aspect, a hardware module that performs a particular function can include the software component stored in a computer-readable medium in connection with the necessary hardware components, such as the processor 1210, bus 1205, output device 1242, and so forth, to carry out various functions of the disclosed technology.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

STATEMENTS OF THE DISCLOSURE

Statement 1: A method for generating multi-modal coherence and/or semblance maps of borehole formations, the method comprising receiving, at a signal processing device of a drilling or logging tool, a plurality of time-domain waveforms from adjacent formations in a borehole environment; processing each of the time-domain waveforms to generate a corresponding plurality of frequency-domain spectrums; selecting a first frequency value and a first slowness value, wherein the first frequency value and the first slowness value correspond with a first pixel location on semblance map; predicting a first travel time associated with the first slowness value; calculating a first semblance value of the frequency-domain spectrums based on the first frequency value, the first slowness value and the first travel time; predicting a second travel time associated with the first slowness value; and calculating a second semblance value of the frequency-domain spectrums based on the first frequency value, the first slowness value and the second travel time.

Statement 2: the method of statement 1, further comprising; calculating a maximum semblance value based on the first travel time and the second travel time; and generating a semblance map based on the maximum semblance value.

Statement 3: the method of one or more of statements 1-2, further comprising: calculating an average semblance value based on the first travel time and the second travel time; and generating a semblance map based on the average semblance value.

Statement 4: the method of one or more of statements 1-3, further comprising: selecting a second frequency value and a second slowness value; predicting a third travel time of a third mode associated with the second slowness value; and calculating a third semblance difference of the time-domain waveforms based on the second frequency value, the second slowness value and the third travel time.

Statement 5: the method of one or more of statements 1-4, wherein selecting the first frequency further comprises: selecting a frequency band corresponding with the first frequency, wherein the frequency band comprises a lower bound frequency value and an upper bound frequency value centered around the first frequency.

Statement 6: the method of one or more of statements 1-5, wherein predicting the first travel time is based on a driving pulse firing delay.

Statement 7: the method of one or more of statements 1-6, wherein predicting the first travel time is based on an associated borehole medium.

Statement 8: the method of one or more of statements 1-7, wherein the first travel time is a time interval value.

Statement 9: a system for acoustic logging, comprising: an acoustic logging or drilling tool having a receiver array configured to receive a plurality of waveforms; at least one processor in communication with the acoustic logging tool; a non-transitory computer-readable storage medium configured to store instructions, the instructions, when executed by the at least one processor, cause the at least one processor to perform operations for: receiving, at a signal processing device of drilling tool, a plurality of time-domain waveforms from adjacent formations in a borehole environment; processing each of the time-domain waveforms to generate a corresponding plurality of frequency-domain waveforms; selecting a first frequency value and a first slowness value, wherein the first frequency value and the first slowness value correspond with a first pixel location on semblance map; predicting a first travel time associated with the first slowness value; calculating a first semblance value of the frequency-domain waveforms based on the first frequency value, the first slowness value and the first travel time; predicting a second travel time associated with the first slowness value; and calculating a second semblance value of the frequency-domain waveforms based on the first frequency value, the first slowness value and the second travel time.

Statement 10: the system of statement 9, wherein the instructions, when executed to determine the formation slowness value, further cause the at least one processor to perform operations for: calculating a maximum semblance value based on the first travel time and the second travel time; and generating a semblance map based on the maximum semblance value.

Statement 11: the system of one or more of statements 9-10, wherein the instructions, when executed to generate the variable density log, further cause the at least one processor to: calculating an average semblance value based on the first travel time and the second travel time; and generating a semblance map based on the average semblance value.

Statement 12: the system of one or more of statements 9-11, wherein the instructions, when executed to generate the variable density log, further cause the at least one processor to perform operations for: selecting a second frequency value and a second slowness value; predicting a third travel time of a third mode associated with the second slowness value; and calculating a third semblance difference of the time-domain waveforms based on the second frequency value, the second slowness value and the third travel time.

Statement 13: the system of one or more of statements 9-12, wherein the instructions, when executed to generate the variable density log, further cause the at least one processor to perform operations for: selecting a frequency band corresponding with the first frequency, wherein the frequency band comprises a lower bound frequency value and an upper bound frequency value centered around the first frequency.

Statement 14: the system of one or more of statements 9-13, wherein the first travel time is based on a driving pulse firing delay.

Statement 15: the system of one or more of statements 9-14, wherein the first travel time is based on an associated borehole medium.

Statement 16: the system of one or more of statements 9-15, wherein the first travel time is a time interval value.

Statement 17: a tangible, non-transitory, computer-readable media having instructions encoded thereon, the instructions, when executed by a processor, are operable to perform operations for: receiving, at a signal processing device of drilling or logging tool, a plurality of time-domain waveforms from adjacent formations in a borehole environment; processing each of the time-domain waveforms to generate a corresponding plurality of frequency-domain spectrums; selecting a first frequency value and a first slowness value, wherein the first frequency value and the first slowness value correspond with a first pixel location on semblance map; predicting a first travel time of a first mode associated with the first slowness value; calculating a first semblance difference of the frequency-domain spectrums based on the first frequency value, the first slowness value and the first travel time of the first mode; predicting a second travel time of a second mode associated with the first slowness value; and calculating a second semblance difference of the frequency-domain spectrums based on the first frequency value, the first slowness value and the second travel time of the second mode.

Statement 18: the tangible, non-transitory, computer-readable media of statement 17, wherein the instructions, when executed by the processor, are further operable to perform operations for: calculating a maximum semblance value based on the first travel time and the second travel time; and generating a semblance map based on the maximum semblance value.

Statement 19: the tangible, non-transitory, computer-readable media of one or more of statements 17-18, wherein the instructions, when executed by the processor, are further operable to perform operations for: calculating an average semblance value based on the first travel time and the second travel time; and generating a semblance map based on the average semblance value.

Statement 20: the tangible, non-transitory, computer-readable media of one or more of statements 17-19, wherein the instructions, when executed by the processor, are further operable to perform operations for: selecting a second frequency value and a second slowness value; predicting a third travel time of a third mode associated with the second slowness value; and calculating a third semblance difference of the time-domain waveforms based on the second frequency value, the second slowness value and the third travel time.

Statement 21: A method, including: receiving, at a signal processing device of a drilling or logging tool, a plurality of time-domain waveforms from adjacent formations in a borehole environment; selecting a first center frequency and a first frequency band associated with the first center frequency; filtering the time-domain waveforms using the first frequency band to generate a plurality of first filtered time-domain waveforms; selecting a first slowness value; performing semblance processing on each of the first filtered time-domain waveforms to generate a first plurality of semblance values, and wherein each of the first plurality of semblance values are associated with a different travel time; and selecting a first semblance value from among the first plurality of semblance values.

Statement 22: the method of statement 21, wherein filtering the time-domain waveforms, further includes processing each of the time-domain waveforms to generate a corresponding plurality of frequency-domain spectrums; processing each of the plurality of frequency-domain spectrums using the first frequency band to generate a plurality of first filtered frequency-domain spectrums; and processing each of the first filtered frequency-domain spectrums to generate a plurality of first time-domain waveforms.

Statement 23: the method of any of statements 21-22, wherein filtering the time-domain waveforms using the first frequency band further comprises: building a time-domain filter using the first frequency band; and filtering the time-domain waveforms using the time-domain filter to generate a plurality of first filtered time-domain waveforms.

Statement 24: the method of any of statements 21-23, wherein selecting the first semblance value from among the first plurality of semblance values further includes: selecting a maximum semblance value from among the first plurality of semblance values.

Statement 25: the method of any of statements 21-24, wherein selecting the first semblance value from among the first plurality of semblance values further includes: selecting an average semblance value from among the first plurality of semblance values.

Statement 26: the method of any of statements 21-25, further including: selecting a second center frequency and a second band width associated with the second center frequency; filtering the time-domain waveforms using the second frequency band to generate a second plurality filtered time-domain waveforms; selecting a second slowness; performing semblance processing on each of the second time-domain waveforms to generate a second plurality of semblance values; and selecting a second semblance value from among the second plurality of semblance values.

Statement 27: method of any of statements 21-26, wherein the first frequency band includes a lower bound frequency value and an upper bound frequency value centered around the first center frequency.

Statement 28: the method of any statements 21-27, wherein each of the different travel times are based on a driving pulse firing delay.

Statement 29: the method of any statements 21-28, wherein each of the different travel time are based on an associated borehole medium.

Statement 30: a system for acoustic logging, comprising: an acoustic logging tool having a receiver array configured to receive a plurality of waveforms; at least one processor in communication with the acoustic logging tool; a non-transitory computer-readable storage medium configured to store instructions, the instructions, when executed by the at least one processor, cause the at least one processor to perform operations for: receiving, at a signal processing device of a drilling or logging tool, a plurality of time-domain waveforms from adjacent formations in a borehole environment; selecting a first center frequency and a first frequency band associated with the first center frequency; filtering the time-domain waveforms using the first frequency band to generate a plurality of first filtered time-domain waveforms; selecting a first slowness value; performing semblance processing on each of the first filtered time-domain waveforms to generate a first plurality of semblance values, and wherein each of the first plurality of semblance values are associated with a different travel time; and selecting a first semblance value from among the first plurality of semblance values.

Statement 31: the system of statement 30, wherein filtering the time-domain waveforms, further includes: processing each of the time-domain waveforms to generate a corresponding plurality of frequency-domain spectrums; processing each of the plurality of frequency-domain spectrums using the first frequency band to generate a plurality of first filtered frequency-domain spectrums; and processing each of the first filtered frequency-domain spectrums to generate a plurality of first time-domain waveforms.

Statement 32: the system of any of statements 30-31, wherein filtering the time-domain waveforms using the first frequency band further includes: building a time-domain filter using the first frequency band; and filtering the time-domain waveforms using the time-domain filter to generate a plurality of first filtered time-domain waveforms.

Statement 33: the system of any of statements 30-32, wherein selecting the first semblance value from among the first plurality of semblance values further includes: selecting a maximum semblance value from among the first plurality of semblance values.

Statement 34: the system of any of statements 30-33, wherein selecting the first semblance value from among the first plurality of semblance values further includes: selecting an average semblance value from among the first plurality of semblance values.

Statement 35: the system of any of statements 30-34, wherein the processor is further configured to perform operations including: selecting a second center frequency and a second band width associated with the second center frequency; filtering the time-domain waveforms using the second frequency band to generate a second plurality filtered time-domain waveforms; selecting a second slowness; performing semblance processing on each of the second time-domain waveforms to generate a second plurality of semblance values; and selecting a second semblance value from among the second plurality of semblance values.

Statement 36: the system of any of statements 30-34, wherein the first frequency band comprises a lower bound frequency value and an upper bound frequency value centered around the first center frequency.

Statement 37: the system of any of statements 30-36, wherein each of the different travel times are based on a driving pulse firing delay.

Statement 38: the system of any of statements 30-37, wherein each of the different travel time are based on an associated borehole medium.

Statement 39: a tangible, non-transitory, computer-readable media having instructions encoded thereon, the instructions, when executed by a processor, are operable to perform operations for: receiving, at a signal processing device of a drilling or logging tool, a plurality of time-domain waveforms from adjacent formations in a borehole environment; selecting a first center frequency and a first frequency band associated with the first center frequency; filtering the time-domain waveforms using the first frequency band to generate a plurality of first filtered time-domain waveforms; selecting a first slowness value; performing semblance processing on each of the first filtered time-domain waveforms to generate a first plurality of semblance values, and wherein each of the first plurality of semblance values are associated with a different travel time; and selecting a first semblance value from among the first plurality of semblance values.

Statement 40: the tangible, non-transitory, computer-readable media of claim 39, wherein filtering the time-domain waveforms, further includes: processing each of the time-domain waveforms to generate a corresponding plurality of frequency-domain spectrums; processing each of the plurality of frequency-domain spectrums using the first frequency band to generate a plurality of first filtered frequency-domain spectrums; and processing each of the first filtered frequency-domain spectrums to generate a plurality of first time-domain waveforms.

What is claimed is:

1. A method, comprising:
   receiving, at a signal processing device of a drilling or logging tool, a plurality of time-domain waveforms from adjacent formations in a borehole environment;
   selecting a first center frequency and a first frequency band associated with the first center frequency;
   filtering the time-domain waveforms using the first frequency band to generate a plurality of first filtered time-domain waveforms;
   selecting a first slowness value from a first plurality of slowness values;
   performing semblance processing on each of the first filtered time-domain waveforms to generate a first plurality of semblance values, and wherein each of the first plurality of semblance values are associated with different travel times that are predicted for the first frequency band from different slowness values of the plurality of slowness values including the first slowness value; and
   selecting a first semblance value from among the first plurality of semblance values.

2. The method of claim 1, wherein filtering the time-domain waveforms, further comprises:
   processing each of the time-domain waveforms to generate a corresponding plurality of frequency-domain spectrums;
   processing each of the plurality of frequency-domain spectrums using the first frequency band to generate a plurality of first filtered frequency-domain spectrums; and
   processing each of the first filtered frequency-domain spectrums to generate a plurality of first time-domain waveforms.

3. The method of claim 1, wherein filtering the time-domain waveforms using the first frequency band further comprises:
   building a time-domain filter using the first frequency band; and
   filtering the time-domain waveforms using the time-domain filter to generate a plurality of first filtered time-domain waveforms.

4. The method of claim 1, wherein selecting the first semblance value from among the first plurality of semblance values further comprises:
   selecting a maximum semblance value from among the first plurality of semblance values.

5. The method of claim 1, wherein selecting the first semblance value from among the first plurality of semblance values further comprises:
   selecting an average semblance value from among the first plurality of semblance values.

6. The method of claim 1, further comprising:
   selecting a second center frequency and a second band width associated with the second center frequency;
   filtering the time-domain waveforms using the second frequency band to generate a second plurality filtered time-domain waveforms;
   selecting a second slowness value from a second plurality of slowness values;
   performing semblance processing on each of the second time-domain waveforms to generate a second plurality of semblance values are associated with different travel times of the second frequency band that are predicted for the second frequency band from different slowness values of the second plurality of slowness values including the second slowness value; and
   selecting a second semblance value from among the second plurality of semblance values.

7. The method of claim 1, wherein the first frequency band comprises a lower bound frequency value and an upper bound frequency value centered around the first center frequency.

8. The method of claim 1, wherein each of the different travel times are based on a driving pulse firing delay.

9. The method of claim 1, wherein each of the different travel time are based on an associated borehole medium.

10. A system for acoustic logging, comprising:
    an acoustic logging tool having a receiver array configured to receive a plurality of waveforms;
    at least one processor in communication with the acoustic logging tool;
    a non-transitory computer-readable storage medium configured to store instructions, the instructions, when executed by the at least one processor, cause the at least one processor to perform operations for:
    receiving, at a signal processing device of a drilling or logging tool, a plurality of time-domain waveforms from adjacent formations in a borehole environment;
    selecting a first center frequency and a first frequency band associated with the first center frequency;
    filtering the time-domain waveforms using the first frequency band to generate a plurality of first filtered time-domain waveforms;
    selecting a first slowness value from a first plurality of slowness values;
    performing semblance processing on each of the first filtered time-domain waveforms to generate a first plurality of semblance values, and wherein each of the first plurality of semblance values are associated with different travel times that are predicted for the first frequency band from different slowness values of the plurality of slowness values including the first slowness value; and
    selecting a first semblance value from among the first plurality of semblance values.

11. The system of claim 10, wherein filtering the time-domain waveforms, further comprises:
    processing each of the time-domain waveforms to generate a corresponding plurality of frequency-domain spectrums;
    processing each of the plurality of frequency-domain spectrums using the first frequency band to generate a plurality of first filtered frequency-domain spectrums; and
    processing each of the first filtered frequency-domain spectrums to generate a plurality of first time-domain waveforms.

12. The system of claim 10, wherein filtering the time-domain waveforms using the first frequency band further comprises:

building a time-domain filter using the first frequency band; and filtering the time-domain waveforms using the time-domain filter to generate a plurality of first filtered time-domain waveforms.

13. The system of claim 10, wherein selecting the first semblance value from among the first plurality of semblance values further comprises:

selecting a maximum semblance value from among the first plurality of semblance values.

14. The system of claim 10, wherein selecting the first semblance value from among the first plurality of semblance values further comprises:

selecting an average semblance value from among the first plurality of semblance values.

15. The system of claim 10, wherein the processor is further configured to perform operations comprising:

selecting a second center frequency and a second band width associated with the second center frequency;

filtering the time-domain waveforms using the second frequency band to generate a second plurality filtered time-domain waveforms;

selecting a second slowness value from a second plurality of slowness values;

performing semblance processing on each of the second time-domain waveforms to generate a second plurality of semblance values are associated with different travel times of the second frequency band that are predicted for the second frequency band from different slowness values of the second plurality of slowness values including the second slowness value; and selecting a second semblance value from among the second plurality of semblance values.

16. The system of claim 10, wherein the first frequency band comprises a lower bound frequency value and an upper bound frequency value centered around the first center frequency.

17. The system of claim 10, wherein each of the different travel times are based on a driving pulse firing delay.

18. The system of claim 10, wherein each of the different travel time are based on an associated borehole medium.

19. A tangible, non-transitory, computer-readable media having instructions encoded thereon, the instructions, when executed by a processor, are operable to perform operations for:

receiving, at a signal processing device of a drilling or logging tool, a plurality of time-domain waveforms from adjacent formations in a borehole environment;

selecting a first center frequency and a first frequency band associated with the first center frequency;

filtering the time-domain waveforms using the first frequency band to generate a plurality of first filtered time-domain waveforms;

selecting a first slowness value from a first plurality of slowness values;

performing semblance processing on each of the first filtered time-domain waveforms to generate a first plurality of semblance values, and wherein each of the first plurality of semblance values are associated with different travel time times that are predicted for the first frequency band from different slowness values of the plurality of slowness values including the first slowness value; and selecting a first semblance value from among the first plurality of semblance values.

20. The tangible, non-transitory, computer-readable media of claim 19, wherein filtering the time-domain waveforms, further comprises:

processing each of the time-domain waveforms to generate a corresponding plurality of frequency-domain spectrums;

processing each of the plurality of frequency-domain spectrums using the first frequency band to generate a plurality of first filtered frequency-domain spectrums; and processing each of the first filtered frequency-domain spectrums to generate a plurality of first time-domain waveforms.

* * * * *